(12) United States Patent
Kim et al.

(10) Patent No.: US 11,894,905 B2
(45) Date of Patent: Feb. 6, 2024

(54) COMMUNICATION DEVICE AND OPERATING METHOD THEREFOR

(71) Applicant: LG ELECTRONICS INC., Seoul (KR)

(72) Inventors: Jeongin Kim, Seoul (KR); Dongsun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/044,334

(22) PCT Filed: Nov. 1, 2021

(86) PCT No.: PCT/KR2021/015611
§ 371 (c)(1),
(2) Date: Mar. 7, 2023

(87) PCT Pub. No.: WO2022/108178
PCT Pub. Date: May 27, 2022

(65) Prior Publication Data
US 2023/0246692 A1   Aug. 3, 2023

(30) Foreign Application Priority Data

Nov. 17, 2020   (KR) ........................ 10-2020-0153852

(51) Int. Cl.
*H04L 5/12* (2006.01)
*H04B 7/06* (2006.01)
(Continued)

(52) U.S. Cl.
CPC ........... *H04B 7/0632* (2013.01); *H04B 7/022* (2013.01); *H04B 17/18* (2015.01)

(58) Field of Classification Search
CPC ....... H04B 7/0632; H04B 7/022; H04B 17/18
(Continued)

(56) References Cited

U.S. PATENT DOCUMENTS

2006/0172712 A1   8/2006   Sievenpiper et al.
2020/0052741 A1   2/2020   Kim et al.

FOREIGN PATENT DOCUMENTS

JP   2020-039077   3/2020
JP   2020-088731   6/2020
(Continued)

OTHER PUBLICATIONS

PCT International Application No. PCT/KR2021/015611, International Search Report dated Feb. 8, 2022, 4 page.

*Primary Examiner* — Helene E Tayong
(74) *Attorney, Agent, or Firm* — LEE, HONG, DEGERMAN, KANG & WAIMEY

(57) ABSTRACT

A communication device includes a plurality of distributed units (DUs), each including an antenna; and a central unit (CU) which is arranged to be spaced from each of the plurality of DUs, and which is connected through each of the plurality of DUs and a plurality of DU links. The central unit measures the channel quality of each of the plurality of DU links, and the central unit can perform control so that power is cut off to the DU corresponding to the DU link if it is determined that the DU link is in an abnormal status during the operation time of a timer (TDU_link) associated with the connection to the DU link, and perform control so that power is supplied to the DU corresponding to the DU link if it is determined that the DU link has returned to a normal status.

18 Claims, 17 Drawing Sheets

(51) Int. Cl.
*H04B 17/18* (2015.01)
*H04B 7/022* (2017.01)

(58) Field of Classification Search
USPC .......................................................... 375/262
See application file for complete search history.

(56) References Cited

FOREIGN PATENT DOCUMENTS

KR    10-2010-0032104        3/2010
KR         20200088863  A  *  7/2020

* cited by examiner (a)

(b)

COMMUNICATION DEVICE AND OPERATING METHOD THEREFOR

CROSS-REFERENCE TO RELATED APPLICATION(S)

This application is the National Stage filing under 35 U.S.C. 371 of International Application No. PCT/KR2021/015611, filed on Nov. 1, 2021, which claims the benefit of earlier filing date and right of priority to Korean Application No. 10-2020-0153852, filed on Nov. 17, 2020, the contents of which are all hereby incorporated by reference herein in their entireties.

TECHNICAL FIELD

The present specification relates to a communication device including a plurality of antennas and a method of operating the same. Specific implementations relate to an autonomous vehicle for performing wireless communication through multiple antennas and a control method thereof.

BACKGROUND ART

When a large area is covered by a single antenna, the problem of a shadow zone occurs. It is the basic concept of a distributed antenna system to install antennas having a relatively small output distributed across multiple places, in order to solve the above problem.

In the case of a distributed antenna system according to the related art, a radio frequency signal is distributed multiple remote units spaced apart from each other such that reliability can be guaranteed with reduced power, and the coverage is improved.

However, the related art has a limitation in that expandability is insufficient because application of distributed antennas is restricted to the BS level, and thus introduction of distributed antennas is necessary at the end terminal level.

Meanwhile, vehicles can be classified into an internal combustion engine vehicle, an external composition engine vehicle, a gas turbine vehicle, an electric vehicle, and the like according to types of motors used therefor.

An autonomous vehicle refers to a self-driving vehicle that can travel without an operation of a driver or a passenger, and an autonomous driving system refers to a system that monitors and controls the autonomous vehicle to perform self-driving.

On the other hand, a main controller in an autonomous vehicle having a distributed antenna structure must operate to interwork with a plurality of distributed antenna modules for normal data transmission and reception. In this regard, in a distributed antenna structure, each antenna module and a main controller may be separated into a distributed unit (DU) and a central unit (CU). However, when a link connection status between the DU and the CU is in an abnormal status or at least one of a plurality of DUs and CUs is in a fault status, there is a problem in that no specific control method has been proposed.

DISCLOSURE OF INVENTION

Technical Problem

An aspect of the present specification is to provide a communication device having a distributed antenna at an end terminal level.

Another aspect of the present specification is to provide a communication device having a digital serial interface between a distributed antenna and a communication modem.

Still another aspect of the present specification is to provide a communication device that selects an antenna having excellent reception quality from a plurality of distributed antennas to transmit and receive data.

Yet still another aspect of the present specification is to provide a communication device that achieves consistent reliability when transmitting and receiving data using a plurality of distributed antennas.

Still yet another aspect of the present specification is to provide a communication device that recovers loss of data when transmitting and receiving data between a communication modem and a distributed antenna.

Yet still another aspect of the present specification is to provide a recovery method for a fault related to a distributed unit (DU) detected in a central unit (CU).

Still yet another aspect of the present specification is to provide a recovery method for a fault detected in a distributed unit (DU).

Technical problems to be solved by the present disclosure are not limited to the above-mentioned technical problems, and other technical problems not mentioned herein will be clearly understood from the following description by those skilled in the art to which the disclosure pertains.

Solution to Problem

A communication device according to an embodiment of the present disclosure may include a plurality of distributed units (DUs) each including an antenna; and a central unit (CU) disposed apart from each of the plurality of distributed units and configured to be connected to each of the plurality of distributed units through a plurality of DU links. The central unit may measure the channel quality of each of the plurality of DU links, control power to be cut off to a distributed unit corresponding to a DU link when it is determined that the DU link is in an abnormal status during an operation time of a timer $T_{DU\_link}$ associated with a DU link connection in the central unit, and control power to be supplied to the distributed unit corresponding to the DU link when it is determined that the DU link has returned to a normal status.

In an embodiment, the central unit may cut off the power of the distributed unit corresponding to the DU link when a cyclic redundancy check (CRC) error or a sequence number (SN) mismatch above a threshold value is detected in the DU link, and supply the power of the distributed unit corresponding to the DU link when the CRC error or the SN mismatch is detected to be below the threshold value.

In an embodiment, the central unit may determine whether the activation of the distributed unit is completed during an operation time of a second timer $T_{DU\_act}$ associated with the activation of the DU link after the DU link becomes a normal status, and control power to be cut off to a distributed unit corresponding to the DU link or transmit a reset message to the distributed unit when it is determined that the activation of the distributed unit is not completed.

In an embodiment, when a fault message is received from the distributed unit, the central unit may determine whether a radio frequency (RF) module and a controller have a fault according to the type of the fault message.

In an embodiment, the central unit may control the distributed unit to perform a hardware reset of the distributed unit when it is determined that the RF module has a fault, and control the distributed unit to perform a software reset of the distributed unit when it is determined that the controller has a fault.

In an embodiment, the central unit may carry out a hardware reset of the distributed unit or cut off the power of the distributed unit when the fault is not cleared after the software reset of the distributed unit is performed.

In an embodiment, the distributed unit may perform a hardware reset when the CU link is in an abnormal status before a third timer $T_{CU\_link}$ determined by the distributed unit is terminated, and the operation time of the third timer $T_{CU\_link}$ may be set to be shorter than the operation time of the timer $T_{DU\_link}$ associated the DU link connection.

In an embodiment, the distributed unit may transmit a fault message to the central unit and perform a hardware reset when a CRC error or a sequence number (SN) mismatch above a threshold value is detected in the DU link.

In an embodiment, the distributed unit may determine whether the activation of the distributed unit is completed during an operation time of a second timer $T_{DU\_act}$ associated with the activation of the DU link after the CU link becomes a normal status, and perform a software reset when it is determined that the activation of the distributed unit is not completed.

In an embodiment, the distributed unit may perform a hardware reset or a software reset according to the type of a reset message when the reset message is received from the central unit.

In an embodiment, the distributed unit may transmit a fault message to the central unit when an error of the RF module or the controller is detected, and perform a hardware reset or a software reset according to the type of a reset message received from the CU.

In an embodiment, the distributed unit may update a watchdog timer to prevent a malfunction of the controller, transmit the fault message to the central unit and perform a software reset when the watchdog timer expires.

In an embodiment, the distributed unit may control a report message to be transmitted through the DU link or a DU link of another distributed unit when it is determined that the quality of the CU link is below a threshold value before the third timer $T_{CU\_link}$ is terminated.

In an embodiment, upon receiving the report message from a specific distributed unit, the central unit may exclude resource allocation for the specific distributed unit and a DU link associated with the specific distributed unit.

In an embodiment, the central unit may be connected to each of the plurality of distributed units through a digital serial interface. The central unit may exclude resource allocation for a specific distributed unit from which the report message has been received and a DU link associated with the specific distributed unit, and generate, as a Tx packet, a Tx data signal and an RF control signal which are input, by using a signal processing (SP) framer in each of one or more SP paths during transmission (Tx). Furthermore, the central unit may select one of the one or more SP paths, and provide the Tx packet through the selected SP path to the remaining distributed unit of a distribution path mapped to the selected SP path.

In an embodiment, the communication device may be mounted on a vehicle. The central unit may control power to be cut off to a specific distributed unit corresponding to the DU link, and exclude communication resource allocation for the specific distributed unit Furthermore, the central unit may measure the quality of each channel except for the DU link for a signal received through a 5G network, and determine at least one distributed unit to be used to transmit or receive data based on the measured channel quality.

A method of operating a communication device according to another aspect of the present specification may include a channel quality measurement step of measuring channel quality for a plurality of DU links that are one-to-one coupled to each of a plurality of distributed units (DUs) each including an antenna; a power cut-off control step of controlling power to be cut off to a distributed unit corresponding to a DU link when it is determined that the DU link is in an abnormal status during an operation time of a timer $T_{DU\_link}$ associated with a DU link connection in a central unit; and a power supply control step of controlling power to be supplied to the distributed unit corresponding to the DU link when it is determined that the DU link has returned to a normal status.

In an embodiment, the method may further include a DU activation determination step of determining whether the activation of the distributed unit is completed during an operation time of a second timer $T_{DU\_act}$ associated with the activation of the DU link after the DU link becomes a normal status; and a DU power cut-off control step of controlling power to be cut off to a distributed unit corresponding to the DU link or transmitting a reset message to the distributed unit when it is determined that the activation of the distributed unit is not completed.

In an embodiment, the method may further include a hardware reset execution step of performing a hardware reset of the distributed unit when a CU link is in an abnormal status before a third timer $T_{CU\_link}$ determined by the distributed unit is terminated; a DU activation determination step of determining whether the activation of the distributed unit is completed during an operation time of a second timer $T_{DU\_act}$ associated with the activation of the DU link after the CU link becomes a normal status; and a software reset execution step of performing a software reset when it is determined that the activation of the distributed unit is not completed.

In an embodiment, the method may further include a report message transmission step of controlling, by the central unit, a report message to be transmitted through the DU link or a DU link of another distributed unit when it is determined that the quality of the CU link is below a threshold value before the third timer $T_{CU\_link}$ is terminated; and a resource allocation exclusion step of excluding resource allocation for a specific distributed unit and a DU link associated with the specific distributed unit when the report message is received from the specific distributed unit.

Advantageous Effects of Invention

The technical effects of a communication device and a method of operating the same according to an embodiment of the present specification are as follows.

According to the present specification, a fault type of a DU detected by a CU may be classified to differently perform a recovery method according to the type, thereby allowing fast recovery according to the fault type.

According to the present specification, while communication with the CU is not maintained, the DU may monitor an activation status with a CU link by itself for recovery to be recovered by a function of restarting the DU.

According to the present specification, when a fault of the DU occurs in a distributed antenna system, it may be quickly recovered or excluded, thereby enhancing the reliability of vehicle communication.

According to the present specification, a structure for mounting an antenna system capable of operating in a broadband on a vehicle may be proposed to support various communication systems.

Further scope of applicability of the present disclosure will become apparent from the foregoing detailed description. It should be understood, however, that the detailed description and specific examples, such as the preferred implementation of the present disclosure, are given by way of illustration only, since various modifications and alternations within the spirit and scope of the disclosure will be apparent to those skilled in the art.

BRIEF DESCRIPTION OF DRAWINGS

The accompanying drawings, which are included to provide a further understanding of the present specification and constitute a part of the detailed description, illustrate embodiments of the present specification and together with the description serve to explain the principle of the present specification.

MODE FOR THE INVENTION

Figure 1:
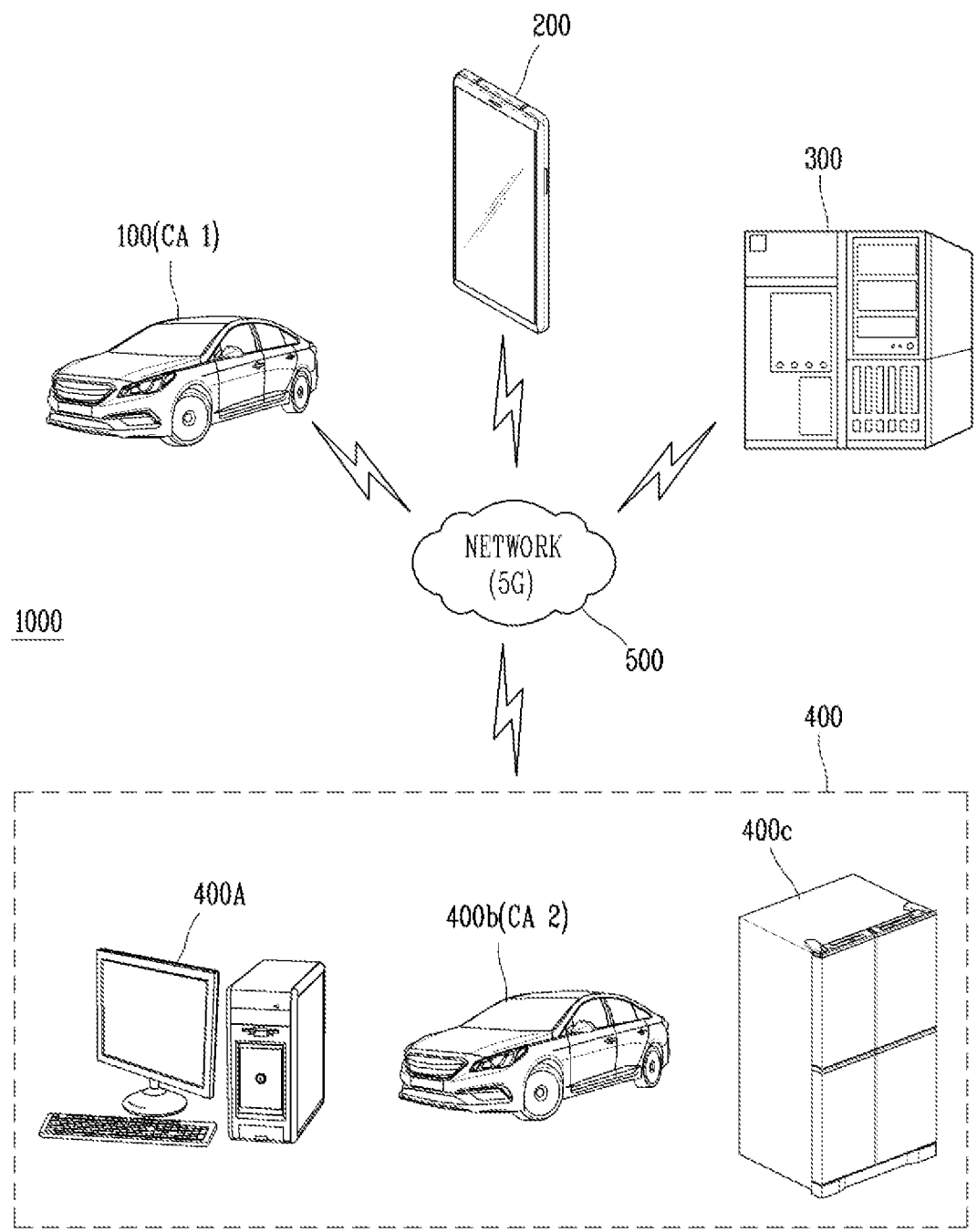
FIG. 1 is a diagram illustrating a cloud system 1000 based on a 5G network according to an embodiment of the present disclosure.

Hereinafter, embodiments will be described in detail with reference to the accompanying drawings. Since the embodiments may be modified in various ways and may take various other forms, specific embodiments will be illustrated in the drawings and described in detail herein. However, this has no intention to limit the embodiments to the specific forms disclosed herein, and it should be understood that all modifications, equivalents, and substitutions may be devised within the technical scope of the embodiments.

Terms such as "first," "second," and other numerical terms when used herein do not imply a sequence or order unless clearly indicated by the context. These terms are generally only used to distinguish one element from another. In addition, terms specially defined in consideration of configurations and operations of the embodiments are merely used to explain the embodiments and do not limit the scope of the embodiments.

Since various embodiments of the present disclosure may utilize techniques relating to artificial intelligence, artificial intelligence will be generally described below.

Artificial intelligence (AI) refers to a field of studying artificial intelligence or a methodology for creating the same. Moreover, machine learning refers to a field of defining various problems dealing in an artificial intelligence field and studying methodologies for solving the same. Machine learning is also defined as an algorithm for improving performance of a task through continuous experiences for the task.

An artificial neural network (ANN) is a model used in machine learning, and may refer in general to a model with problem-solving abilities, composed of artificial neurons (nodes) forming a network by a connection of synapses. The artificial neural network may be defined by a connection pattern between the neurons of different layers, a learning process of updating a model parameter, and an activation function for generating an output value.

The ANN may include an input layer, an output layer, and may selectively include one or more hidden layers. Each layer may include one or more neurons, and the ANN may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, hyperparameters refer to parameters which are set before learning in a machine learning algorithm, and include a learning rate, a number of iterations, a mini-batch size, an initialization function, and the like.

The objective of training an ANN is to determine a model parameter for significantly reducing a loss function. The loss function may be used as an indicator for determining an optimal model parameter in a learning process of an ANN.

The machine learning may be classified into supervised learning, unsupervised learning, and reinforcement learning depending on the learning method.

Supervised learning may refer to a method for training an artificial neural network with training data that has been given a label. In addition, the label may refer to a target answer (or a result value) to be guessed by the artificial neural network when the training data is input to the artificial neural network. Unsupervised learning may refer to a method for training an ANN using training data that has not been given a label. Reinforcement learning may refer to a learning method for training an agent defined within an environment to select an action or an action order for maximizing cumulative rewards in each state.

Machine learning of an artificial neural network implemented as a deep neural network (DNN) including a plurality of hidden layers may be referred to as deep learning, and the deep learning is one machine learning technique. Hereinafter, the meaning of machine learning may include deep learning.

FIG. 1 is a diagram illustrating a cloud system 1000 based on a 5G network according to an embodiment of the present disclosure.

Referring to FIG. 1, the cloud system 1000 may include a first communication device 100 mounted on a first vehicle CA1, a mobile terminal 200, a control system 300, various devices 400, and a 5G network 500.

The first communication device 100 may include multiple distributed antennas, and may include a communication modem configured to efficiently control the multiple distributed antennas. The first communication device 100 may be installed in the first vehicle CA1 to communicate with at least one of the mobile terminal 200, the control system 300, the various devices 400, and the 5G network 500.

Additionally, the first communication device 100 may additionally include a multiple input and multiple output (MIMO) module for expanding the capacity of wireless communication.

The mobile terminal 200 may communicate with the first communication device 100 via the 5G network 500, and may transmit a control command to the first communication device 100. The mobile terminal 200 may provide information, based on an image, and the mobile terminal 200 may include mobile devices such as a mobile phone, a smartphone, and a wearable device, for example, a watch-type terminal (smartwatch), a glasses-type terminal (smart glass), and a head mounted display (HMD).

The control system 300 may provide various information to the communication device 100, and respond to various requests from the communication device 100. In an embodiment, the control system 300 may perform a complex operation (for example, a deep learning operation) requested by the communication device 100. To this end, the control system 300 may store various information for performing an operation in a system memory.

The various devices 400 may include a personal computer (PC) 400a, a second communication device 400b mounted on a second vehicle CA2, a refrigerator 400c, and the like. The various devices 400 may be connected to the first communication device 100, the control system 300, and the like via the 5G network 500.

All of the first communication device 100, the mobile terminal 200, the control system 300, and the various devices 400 may be equipped with a 5G module to transmit or receive data at a speed of 100 Mbps to 20 Gbps (or higher). Accordingly, each configuration of the cloud system 1000 may transmit a large-capacity video file to various devices, and may be driven with low power, so that power consumption can be minimized. However, the transmission speed may vary according to an implementation example.

The 5G network 500 may provide a communication environment of devices by wire or wireless, and the communication environment may include a 5G mobile communication network, a local area network, the Internet, and the like.

The first communication device 100 may transmit and receive data to and from a server and various communicable terminals via the 5G network. Specifically, the first communication device 100 may perform data communication with a server and a terminal by using at least one service among enhanced mobile broadband (eMBB), ultra-reliable and low latency communications (URLLC), and massive machine-type communications (mMTC), via the 5G network.

The enhanced mobile broadband (eMBB) is a mobile broadband service, and provides multimedia contents and wireless data access. In addition, more improved mobile services such as a hot spot and broadband coverage for receiving explosively increasing mobile traffic may be provided via the eMBB. Through a hot spot, high-volume traffic may be received in an area with low user mobility and high density. Through broadband coverage, a wide-range and stable wireless environment and user mobility may be guaranteed.

An ultra-reliable and low latency communications (URLLC) service defines requirements that are far more stringent than the existing LTE in terms of reliability and transmission delay of data transmission and reception, and corresponds to a 5G service for production process automation in an industrial field, telemedicine, remote surgery, transportation, safety, and the like.

A massive machine-type communications (mMTC) service is a transmission delay-insensitive service that requires a relatively small amount of data transmission. The mMTC enables a much larger number of terminals, such as sensors, than general mobile phones to be simultaneously connected to a wireless access network. In this case, the price of a communication module of a terminal should be inexpensive, and improved power efficiency and power saving technology are required such that the terminal can operate for many years without battery replacement or recharging.

Hereinafter, the communication device 100 will be described assuming that the communication device is mounted on the first vehicle CA1 but the communication device 100 may be implemented as a separate device without being mounted on a specific device.

Figure 2:
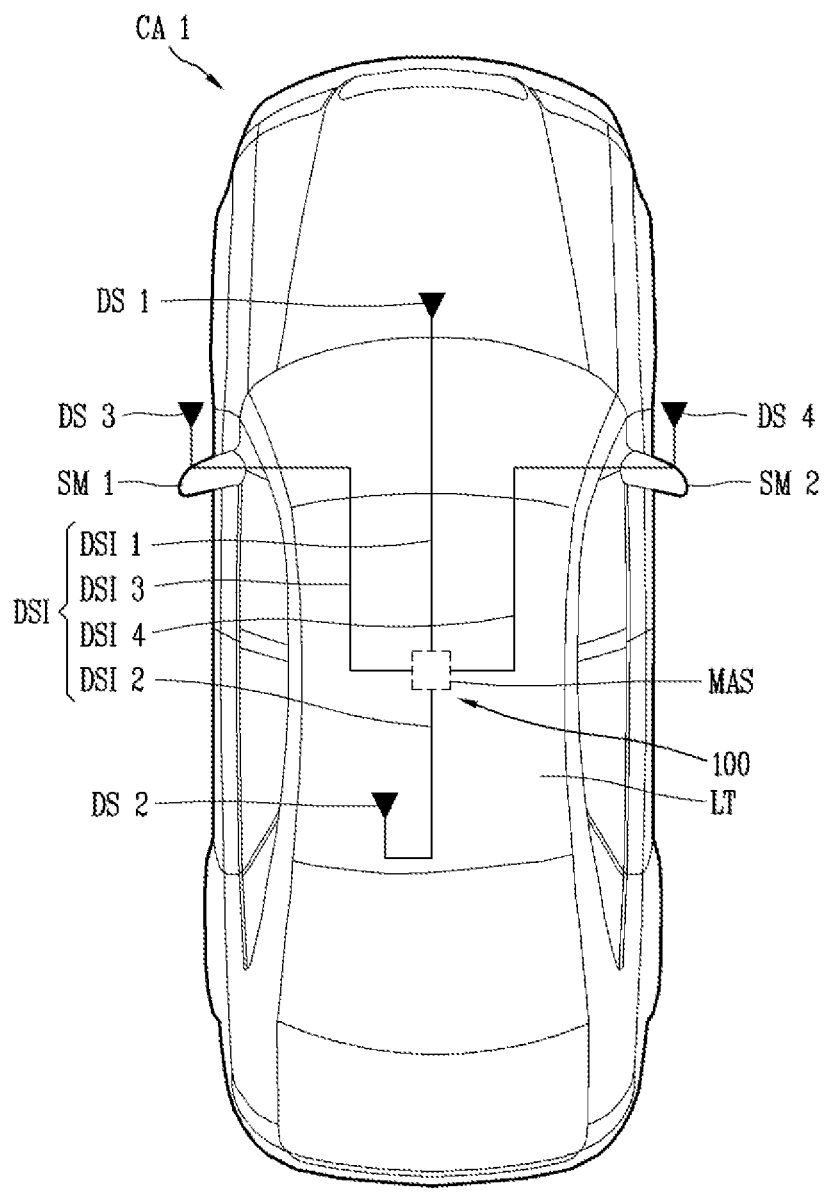
FIG. 2 is a diagram illustrating a communication device 100 mounted on a vehicle according to an embodiment of the present disclosure.

FIG. 2 is a diagram illustrating a communication device 100 mounted on a vehicle according to an embodiment of the present disclosure.

Referring to FIG. 2, the communication device 100 may include multiple slaves DS1 to DS4 and a master MAS configured to control the multiple slaves DS1 to DS4.

The master MAS includes a communication modem and may control the overall operation of the communication device 100. The master MAS may be linked with an electric control unit (ECU) of the vehicle.

The master MAS may control the multiple slaves DS1 to DS4, and each of the multiple slaves DS1 to DS4 may be referred to as a slave or a distributed slave DS. The master MAS may be disposed to be spaced a predetermined distance apart from the multiple slaves DS1 to DS4.

The master MAS may be physically and electrically connected to the multiple slaves DS1 to DS4 through digital serial interfaces DSI1 to DSI4. The digital serial interfaces DSI are interfaces which support serial communication, and may connect communication entities (MAS) DS1 to DS4 of a long distance (for example, up to 10 meters or more). A prior art digital interface connects communication entities of a short distance, and the DSI is an improvement on the prior art digital interface.

Each of the multiple slaves DS1 to DS4 may be disposed at a front or rear side DS1 or DS2 of a roof top LT, and may be disposed at a predetermined position of a side mirror SM1 or SM2, but the embodiment is not limited thereto. Each of the multiple slaves DS1 to DS4 may be connected to a network by using a radio frequency (RF) module.

Figure 3:
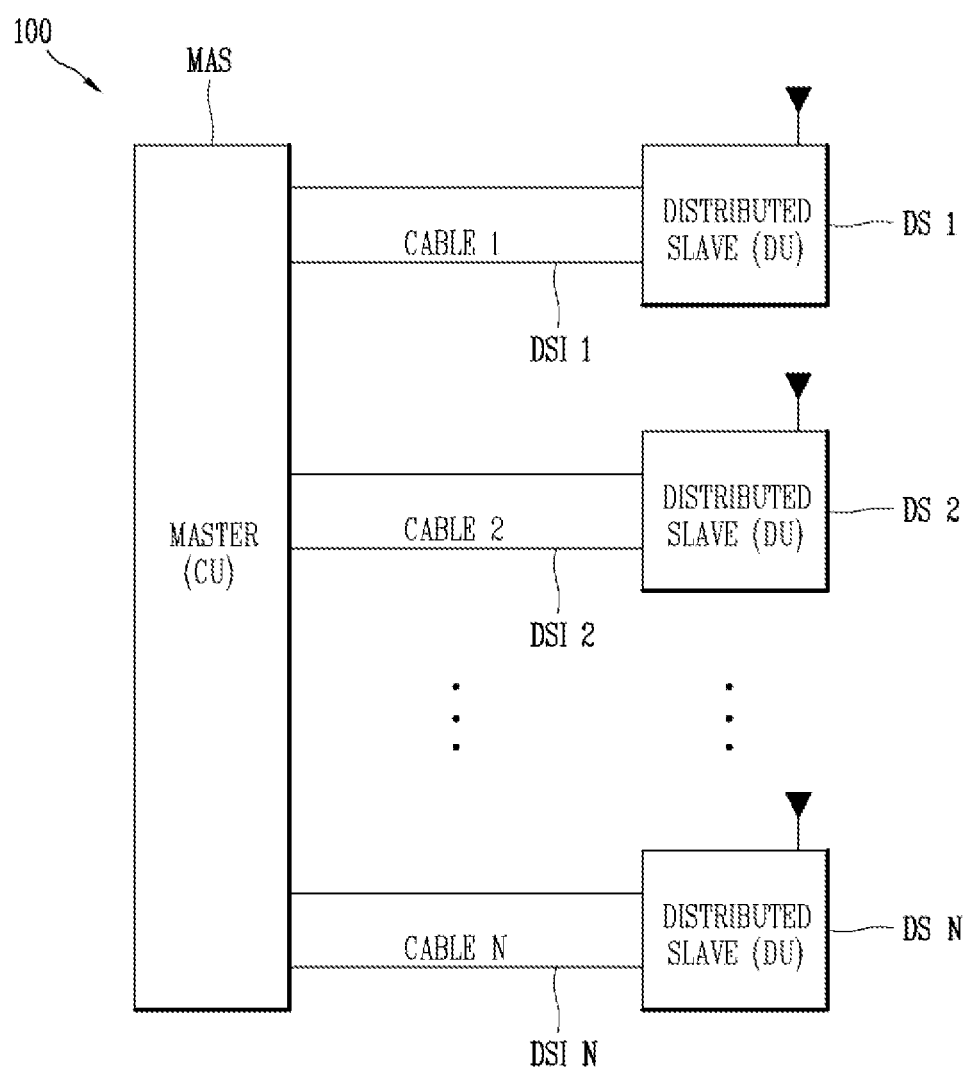
FIG. 3 is a block diagram schematically illustrating a configuration of a communication device 100 according to an embodiment of the present disclosure.

FIG. 3 is a block diagram schematically illustrating a configuration of a communication device 100 according to an embodiment of the present disclosure.

Referring to FIG. 3, the communication device 100 may include the master MAS, the multiple slaves (DS) DS1 to DSN, and the digital serial interfaces (DSI) DSTI1 to DSIN configured to connect the master MAS and the multiple slaves (DS) DS1 to DSN. The master MAS may include a baseband communication modem. The master MAS may be referred to as a central unit (CU), and a plurality of slaves (DSs) DS1 to DSN may be referred to as a plurality of distributed units (DUs) DU1 to DUN.

The master MAS may include a baseband communication modem. The master MAS may include multiple signal processing (SP) paths corresponding to antenna paths. The multiple signal processing paths may be mapped to the slaves configured to transmit or receive data, and will be described in detail with reference to FIG. 4, and omitted here.

Each of the multiple slaves DS1 to DSN may include an RF module (for example, DS_RFM in FIG. 4) including an analog to digital converter (ADC), a DAC, various filters (LPF and BPF), various amplifiers (LNA and PA), an RF switch/duplexer, and a splitter, and may receive data/a control signal from a network and telegraph the same to the network.

The communication device 100 may include the digital serial interfaces (DSI) DSI1 to DSIN, each of which is disposed between the master MAS and each of the multiple slaves DS1 to DSN. In an alternative embodiment, the digital serial interfaces (DSI) may be implemented as Ethernet communication cables for a vehicle.

By applying the digital serial interfaces, data transmission with high reliability may be performed between the master (MAS) and the multiple slaves DS1 to DSN, and compared to the existing analog interface and digital interface, a distance between the master (MAS) and the multiple slaves DS1 to DSN may be implemented longer. The digital serial interfaces may be implemented as a single channel or a multi-channel according to a required bandwidth.

Figure 4:
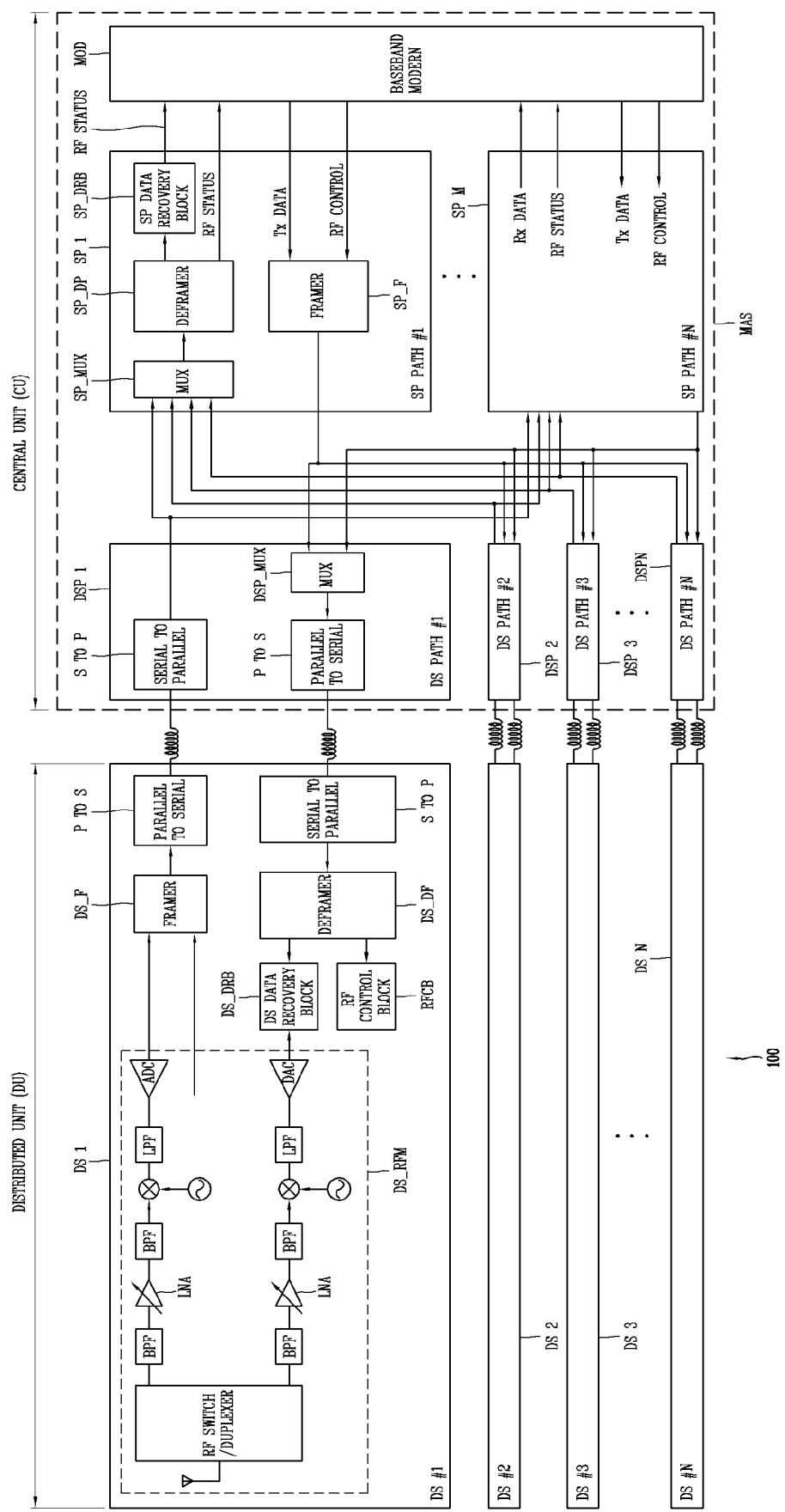
FIG. 4 is a block diagram illustrating, in detail, a function of a communication device 100 according to an embodiment of the present disclosure.
Figure 5:
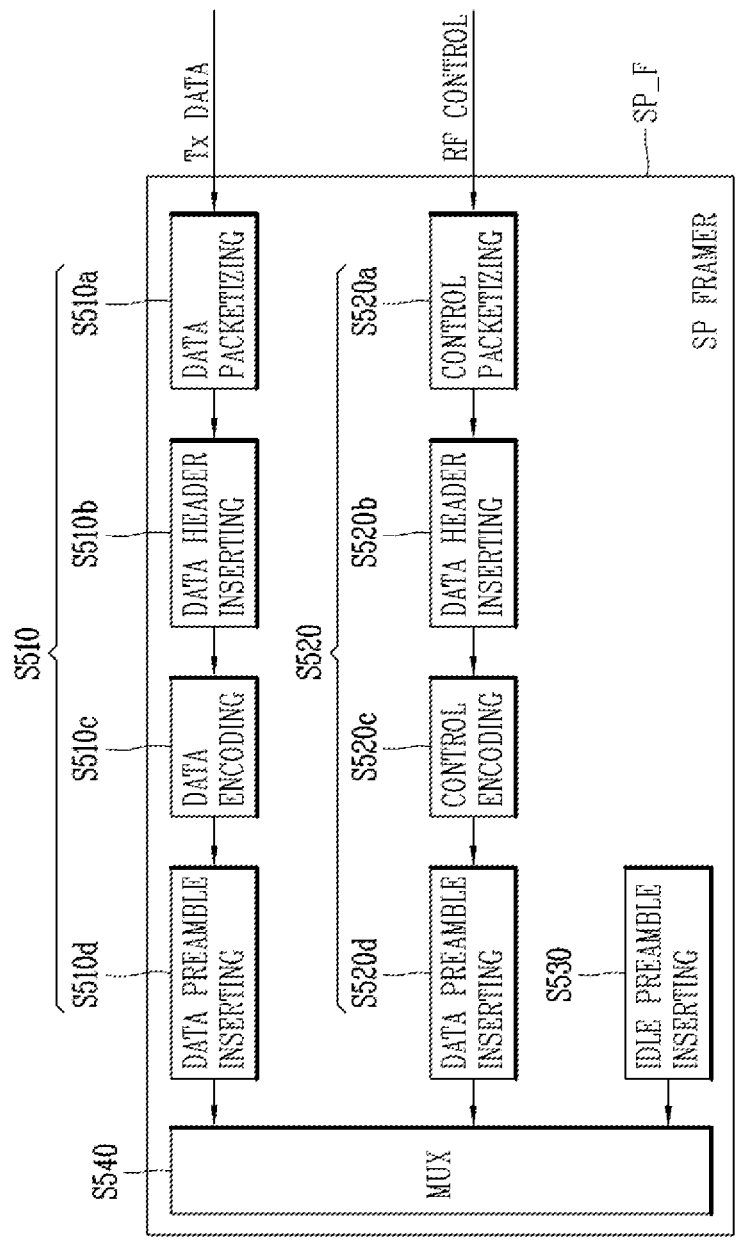
FIGS. 5 and 6 are diagrams illustrating an operation of a communication device 100 in a transmission (Tx) mode according to an embodiment of the present disclosure.
Figure 6:
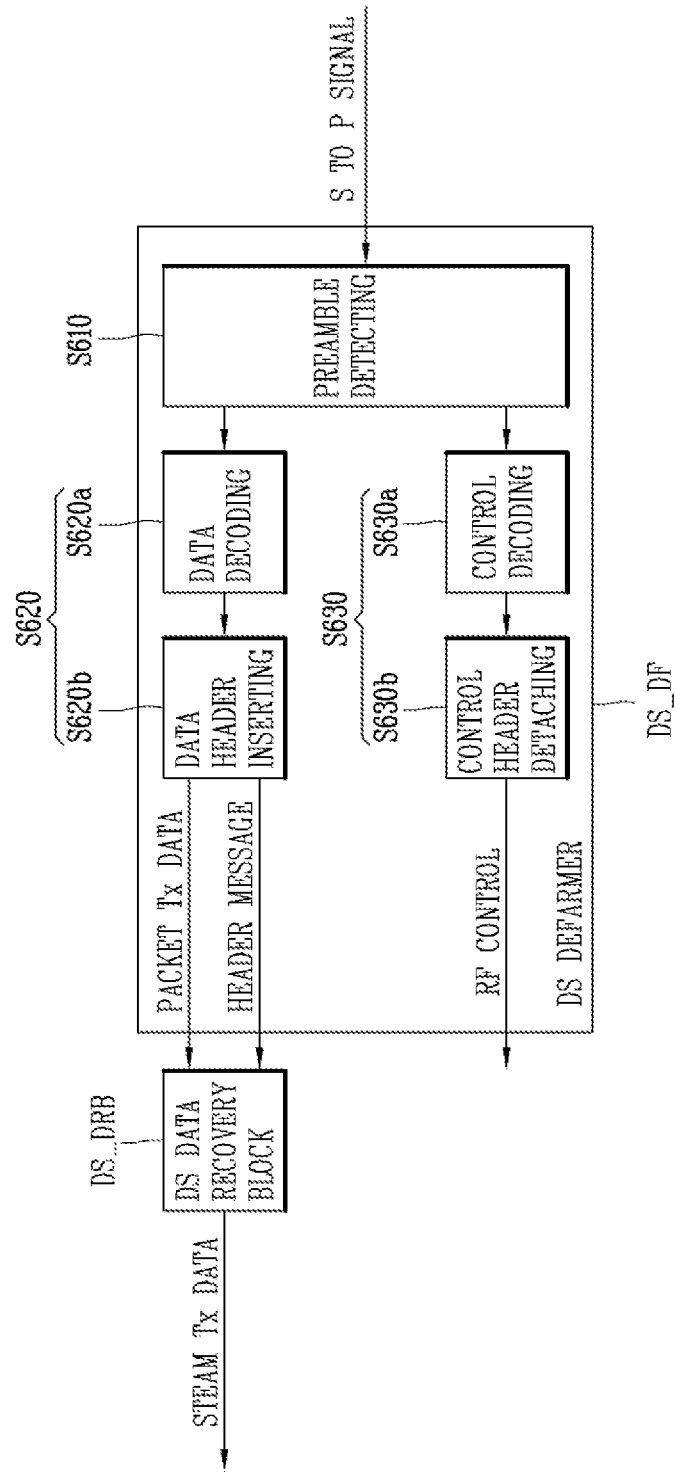
Figure 7:
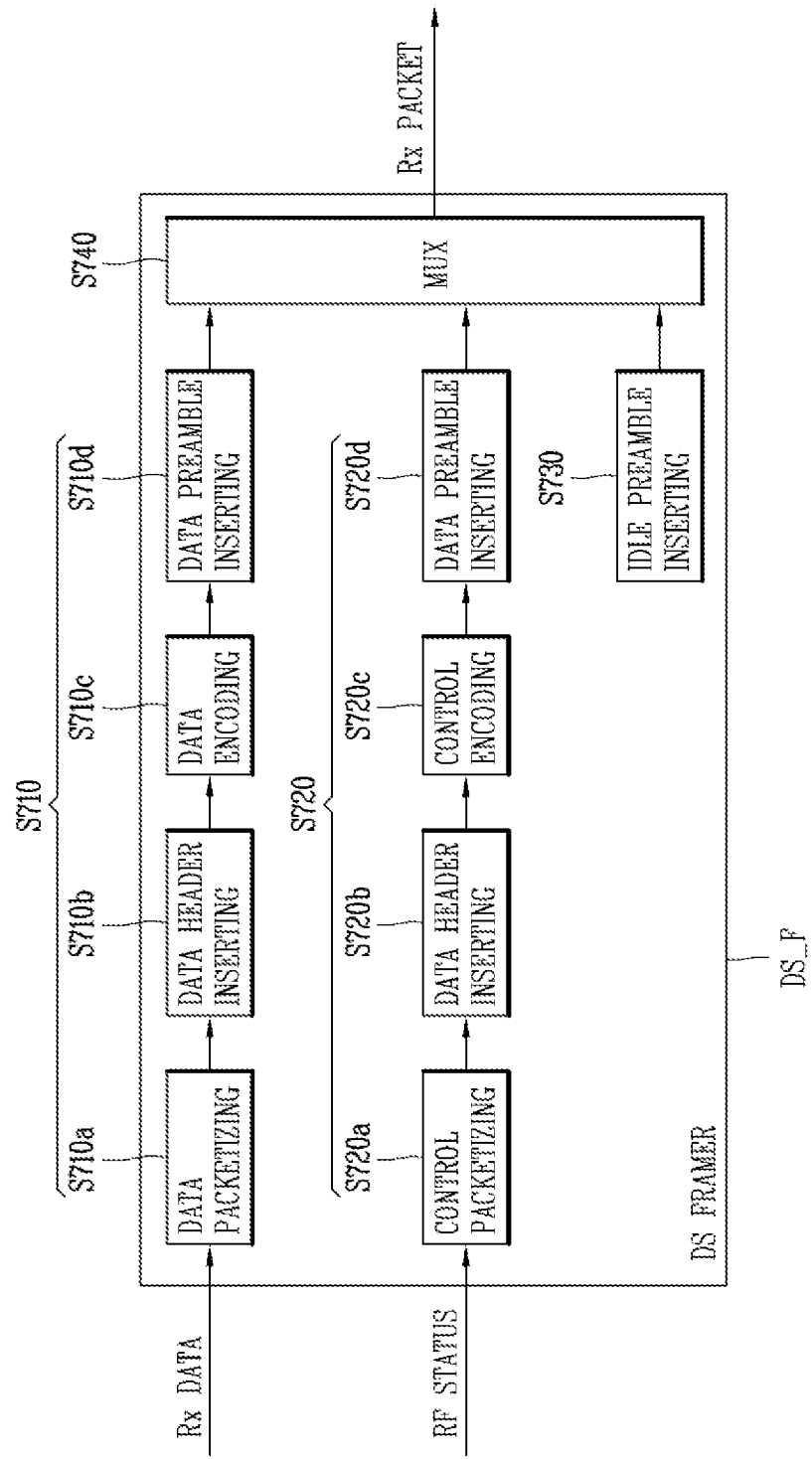
FIGS. 7 and 8 are diagrams illustrating an operation of a communication device 100 in a reception (Rx) mode according to an embodiment of the present disclosure.
Figure 8:
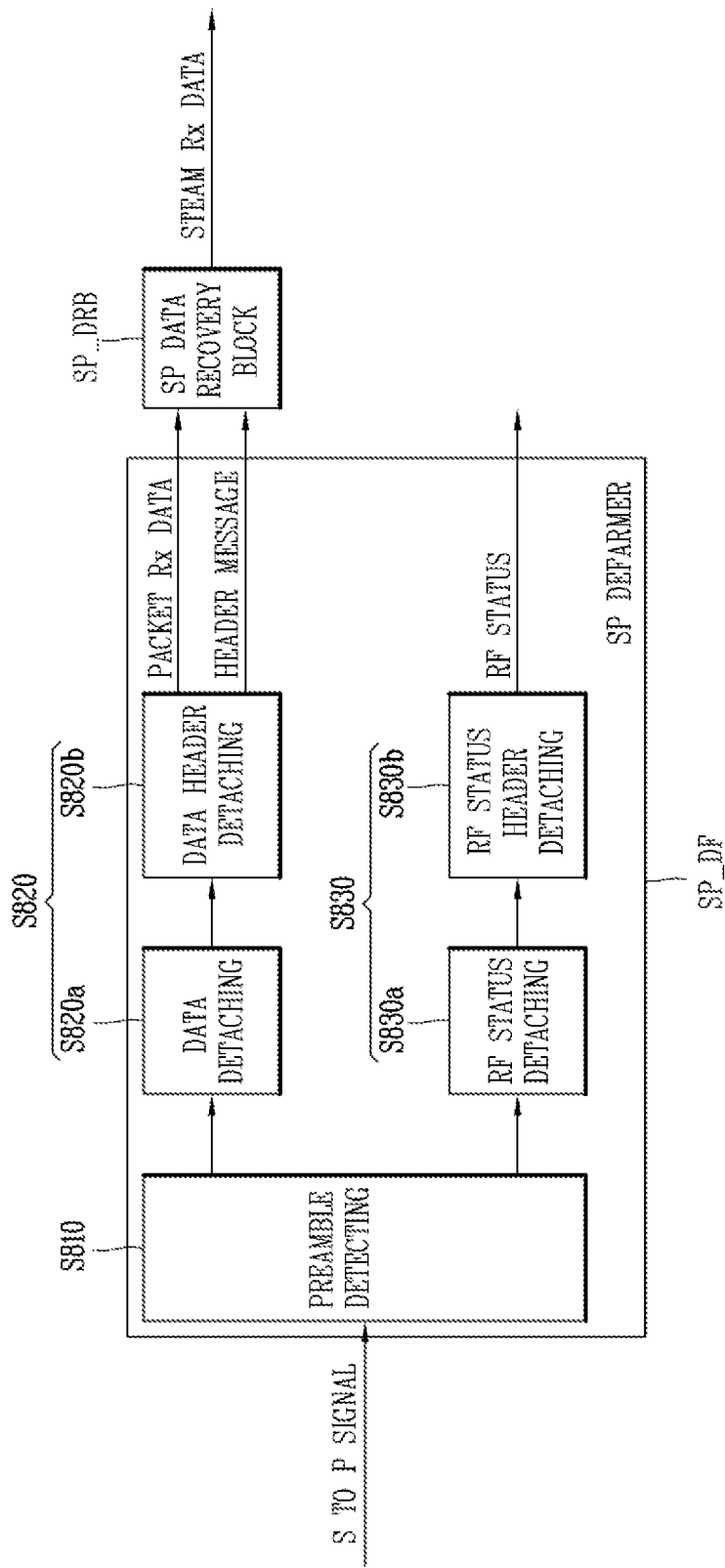

FIG. 4 is a block diagram illustrating, in detail, a function of a communication device 100 according to an embodiment of the present disclosure. For a more detailed description, FIGS. 5 to 8 may be referred to together. FIGS. 5 and 6 are diagrams illustrating an operation of the communication device 100 in a transmission (Tx) mode according to an embodiment of the present disclosure, and FIGS. 7 and 8 are diagrams illustrating an operation of the communication device 100 in a reception (Rx) mode according to an embodiment of the present disclosure.

Referring to FIG. 4, the communication device 100 may include the master MAS and the multiple slaves (DS) DS1 to DSN, and may include the digital serial interfaces (DSI) DSI1 to DSN, which are serial communication interfaces and each of which is disposed between the master (MAS) and each of the slaves (DS) DS1 to DSN. As aforementioned, the communication device 100 may configure a distributed antenna system. The master MAS may be referred to as a central unit (CU), and a plurality of slaves (DSs) DS1 to DSN may be referred to as a plurality of distributed units (DUs) DU1 to DUN.

The master MAS may be a configuration for controlling a communication modem (Mod), and may be a configuration indicating a function. The master MAS may include the SP paths (SP) SP1 to SPM corresponding to the communication modem (Mod) and the antenna paths, and distributed paths (DSP) DSP1 to DSPN coupled one-to-one with the multiple slaves (DS) DS1 to DSN. The number of the distributed paths (DSP) DSP1 to DSPN is the same as the number of the multiple slaves (DS) DS1 to DSN, and the distributed paths may be coupled one-to-one with the slaves.

The SP paths (SP) SP1 to SPM and the distributed paths (DSP) DSP1 to DSPN may be mapped to each other, and the number of the SP paths (SP) SP1 to SPM may be implemented to be less than the number of the distributed paths (DSP) DSP1 to DSPN, but the embodiment is not limited thereto. If the number of the SP paths (SP) SP1 to SPM is implemented to be less than the number of the distributed paths (DSP) DSP1 to DSPN, the device may be controlled more efficiently, and this is because the number of the distributed antennas used for actual transmission and reception may be limited while widening a coverage by disposing the number of the distributed antennas widely.

In addition, since the SP paths (SP) SP1 to SPM are paths for allowing the communication device 100 to simultaneously process transmission or reception, and the master MAS may transmit or receive data, based on the number of the SP paths (SP) SP1 to SPM. Accordingly, the cost of a transmission/reception circuit can be economically saved, and the same may be applied to an existing communication modem.

The master MAS may map each of the SP paths (SP) SP1 to SPM and the distributed paths (DSP) DSP1 to DSPN differently. The master MAS may determine a slave for transmission or reception by monitoring channel qualities of the distributed paths (DSP) DSP1 to DSPN.

The master MAS may measure a channel quality of each of the multiple distributed paths (DSP) DSP1 to DSPN at a predetermined period and each time data is transmitted and received, and map the distributed paths (DSP) DSP1 to DSPN and the SP paths (SP) SP1 to SPM, based on the measured channel quality.

Specifically, the master MAS may map the distributed paths (DSP) DSP1 to DSPN according to the number M of the SP paths (SP) SP1 to SPM, and the master MAS may map M distributed paths having a high-power intensity among the distributed paths (DSP) DSP1 to DSPN to the SP paths (SP) SP1 to SPM, and map M distributed paths having a high received signal intensity (SNR) to the SP paths (SP) SP1 to SPM.

In addition, the master MAS may select M slaves spaced a predetermined distance apart from each other. Accordingly, when a radio shadow area of the communication device 100 occurs, data may be transmitted or received with higher reliability. In the case where the master MAS selects multiple antennas spaced a predetermined distance apart from each other, higher reliability may be provided than the case where the master selects multiple antennas having an excellent channel quality but closely arranged.

The master MAS may select a slave in proper consideration of a received power intensity (reception intensity) and a distance between slaves.

For example, as shown in FIG. 2, when the multiple slaves DS1 to DS4 are configured and there are two SP paths SP1 and SP2, it may be assumed that a reception power intensity of a first slave DS1 is 10 dB, a reception power intensity of a second slave DS2 is 7 dB, a reception power intensity of a third slave DS3 is 9 dB, and a reception power intensity of a fourth slave DS4 is 8 dB.

In this case, the master MAS may simultaneously select two slaves according to the number of the SP paths. Considering a reception power intensity in a specific time zone, the first slave DS1 and the third slave DS3 may be selected, and the first slave DS1 and the second slave DS2 which are far apart from each other may be selected in order to perform communication with high reliability.

To this end, the master MAS may select slaves corresponding to the SP paths SP1 and SP2, based on information such as a region, a time, a traveling path, and a traveling time, and may be performed by an operation by artificial intelligence.

As described above, the master MAS may simultaneously perform signal processing (transmission or reception) as many as the number corresponding to the SP paths SP1 to SPM, and transmit or receive data through the slaves coupled to the distributed paths, based on the channel qualities of the distributed paths. In this case, the SP paths and the distributed paths may be mapped one-to-one, and the mapping may be changed in real time.

Hereinafter, a process in which the communication device 100 transmits data to a network in a transmission mode will be described.

The master 100 may simultaneously perform processing on stream-based Tx Data and RF control signals in a first SP path SP1 to an M-th SP path SPM.

During transmission (Tx), the master 100 may generate, as a Tx packet, a Tx data signal and an RF control signal which are input, by using a signal processing framer SP_F in each of the SP paths (SP) SP1 to SPM.

Specifically, when the first SP path SP1 is described with reference to FIG. 5 the SP framer SP_F of the master 100 packetizes each of a Tx data signal and an RF control signal (S510a and S520a), adds a header including a sequence number to the packetized Tx data signal and the packetized RF control signal (S510b and S520b), performs data encoding for error recovery (S510c and S520c), and adds a preamble to the encoded data (S510d, S520d, and S530), so as to generate a Tx packet. The SP framer SP_F may generate a Tx packet through an MUX (S540) giving priority to an RF control signal, and may make transmission of a Tx data packet wait until the RF control signal is transmitted. The master MAS may operate to give higher reliability to a control signal than a large amount of Tx data signal.

When the packet size of the RF control signal is small in operation S520a, the master MAS may uniformly packetize the size. The master MAS may distinguish a Tx data packet and an RF control packet through the preamble, and when there is no Tx data packet and RF control packet, generate and transmit an idle packet for constant transmission.

The master MAS may select one (for example, SP1) of one or more SP paths, and may provide a Tx packet to a distributed path mapped to the selected SP path SP1, through the selected first SP path SP1. When the distributed path mapped to the selected SP path SP1 is a first distributed path DSP1, the distributed path DSP1 may select the first SP path SP1 through an MUX (DSP_MUX).

The master MAS may determine a slave and a distributed path through which Tx data is to be transmitted to the network, based on the channel quality. For example, the master MAS may select the first SP path SP1 to transmit Tx data to the first slave DS1 through the first distributed path DSP1.

The master MAS may perform parallel to serial (P to S) encoding with respect to a Tx packet output through the MUX (DSP_MUX), in the distributed path DSP1 mapped to the selected SP path SP1, and transmit the encoded Tx data signal and RF control signal to the slave DS1 coupled to the distributed path DSP1 through the DSP1.

In relation to the P to S encoding, 8b/10b or 64b/66b encoding may be performed, but the embodiment is not limited thereto.

If the selected SP path SP1 is mapped to the first distributed path DSP1, the first slave DS1 coupled to the first distributed path DSP1 may receive the encoded TX data signal and RF control signal through a digital serial interface DSI1, and perform serial to parallel (S to P) decoding, so as to transmit the decoded signal to the network through an antenna. The S to P decoding may be performed according to an encoding scheme (for example, 8b/10b or 64b/66b).

When the first slave DS1 is selected and determined, a detailed operation of the slave will be described with reference to FIG. 6. A DS deframer DS_DF may detect preambles of a Tx data packet and an RF Control packet in a serial to parallel (S to P) decoded signal (S610), perform decoding for error recovery on each of the Tx data packet and the RF control packet (S620a and S630a), remove a header (S620b and S630b), and provide packetized Tx data and a header message to a DS data recovery block (DRB) (S640).

The RF control signal may be transmitted to an RF control block (RFCB of FIG. 4), and when a Tx data signal is transmitted using an RF module DS_RFM, necessary control information may be transmitted. In the case of the RF control signal, the RF control signal has a small size and thus may be transmitted with high reliability.

The DS data recovery block DS_DRB may remove noise, based on the packetized Tx data and the header message, and when a part of the packetized Tx data is lost, recover a lost packet. Specifically, a previous data value or a NULL value may be added to a lost area. Accordingly, system problems such as rebooting and malfunction of the communication device 100 can be prevented.

Hereinafter, an operation of the communication device 100 in a reception mode Rx will be described. The communication device 100 may receive both of an Rx data signal and an RF status signal through each of the multiple slaves (DS) DS1 to DSN.

Each of the multiple slaves (DS) DS1 to DSN may receive a signal through the provided RF module (for example, DS_RFM).

For example, the first slave DS1 may generate, as an Rx packet, an Rx data signal and an RF status signal which are input, by using a DS framer DS_F during reception (Rx). The RF status signal may include an AGC gain value, an RSSI gain value, and the like.

The first slave DS1 may perform parallel to serial (P to S) encoding, and transmit, as an RX packet, the encoded signal to the distributed path DSP1 coupled to each of the slaves through the digital serial interface DSI1.

The master MAS may perform S to P decoding in each of the multiple distributed paths (DSP) DSP1 to DSPN. In addition, the master MAS may select a distributed path (typically, DSP1 of DS1). This may be performed in an MUX (typically, SP_MUX of SP1) on the SP path mapped to the distributed path.

The master MAS may receive an input of the S to P decoded signal so as to generate an Rx data signal and an RF status signal through an SP deframer SP_DF.

Hereinafter, the reception mode Rx will be described in more detail, but a process of reception from the first slave DS1 to the first SP path SP1 will be described. The process will be described with reference to FIGS. 7 and 8 together.

The DS framer DS_F of the first slave DS1 may packetize each of an Rx data signal and an RF status signal (S710a and S720a), add a header including a sequence number to the packetized Rx data signal and the packetized RF status signal (S710b and S720b), perform data encoding (S710c and S720c), and add a preamble to the encoded data (S710d, S720d, and S730), so as to generate an Rx packet. In this case, by giving more weighting to the RF status signal in an MUX (S740) process, the Rx data signal may be stored until all RF status signals are received.

The DS framer DS_F may perform P to S encoding to provide the encoded signal to the first distributed path DSP1 coupled to the first slave DS1. The first distributed path DSP1 may perform S to P decoding to transmit the Rx packet to the first SP path SP1 mapped to the first distributed path DSP1.

The SP deframer SP_DF of the master MAS may detect preambles of an Rx data packet and an RF status packet in the S to P decoded signal (S810), perform decoding with respect to each of the Rx data packet and the RF status packet (S820a and S830a), remove a header (S820b and S830b), and provide packetized Rx data and a header message to an SP data recovery block (SP_DRB).

The SP data recovery block SP_DRB may recover a lost part in the Rx data signal like a Tx data signal.

Hereinafter, a fault recovery method of a distributed unit (DU) in a distributed antenna system according to the present specification and a communication device performing the same will be described in detail. In this regard, the master MAS of FIGS. 2 to 4 may correspond to a central unit (CU), and the slave DS may correspond to a distributed unit (DU). Meanwhile, a plurality of slaves DS1 to DSN may correspond to a plurality of distributed units DU1 to DUN.

Referring to FIG. 4, a communication device corresponding to a distributed antenna structure may include one central unit (CU) and N distributed units (DUs). In general, an RF module and a baseband processor may be directly connected to each other on the same board. However, in a distributed antenna system according to the present specification, the RF module and the baseband processor may be implemented as separate boards. In this regard, FIG. 9 illustrates diagrams in which a configuration in which an RF module and a baseband processor are implemented on the same board and a configuration in which the RF module and the baseband processor are implemented on separate boards different from each other are compared.

Figure 9:
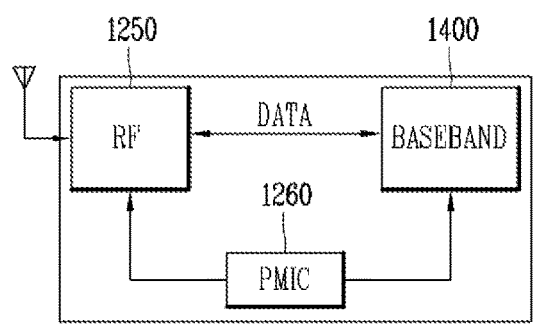
FIG. 9 illustrates diagrams in which a configuration in which an RF module and a baseband processor are implemented on the same board and a configuration in which the RF module and the baseband processor are implemented on separate boards different from each other are compared.
Figure 9:
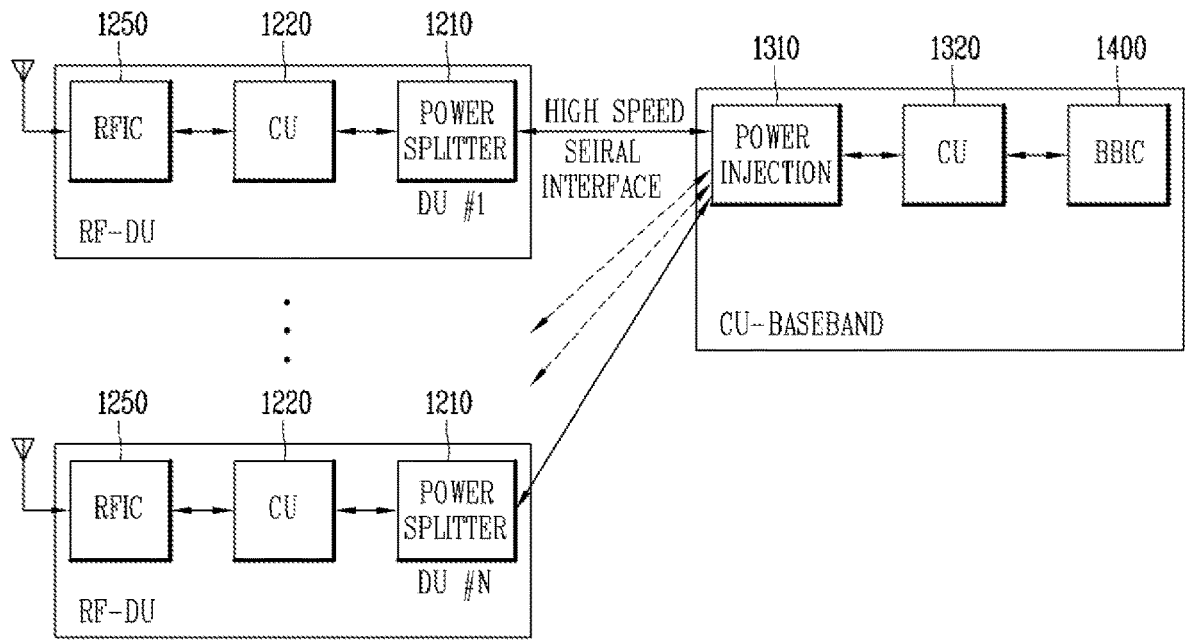

Referring to (a) of FIG. 9, an RF module 1250 and a baseband processor 1400 may be implemented on the same board. Data may be transmitted and received between the RF module 1250 and the baseband processor 1400, and a power management integrated circuit (PMIC) 1260 may be disposed between the RF module 1250 and the baseband processor 1400.

Referring to (b) of FIG. 9, in a distributed antenna system, the RF module may be configured as a DU board, and the baseband processor may be configured as a separate CU board. Referring to FIG. 4 and (b) of FIG. 9, a distributed unit (DU) may be referred to as an RF-DU, and a central unit (CU) may be referred to as a CU-Baseband. Accordingly, a communication device of a distributed antenna system may include one CU-Baseband and N RF-DUs. For convenience, the CU-Baseband and the RF-DU may be referred to as a CU and a DU, respectively.

In this regard, the central unit (CU) may include a power injector 1310, a CU controller 1320, and a baseband processor 1400. The CU controller 1320 and the baseband processor 1400 may also be referred to as a modem. A plurality of distributed units (DUs) may be configured to include a first distributed unit DU1 to an N-th distributed unit DUN. Each distributed unit may be configured to include a power distributor 1210, a DU controller 1220 and an RF module 1250.

The DU and the CU may be connected through a high-speed serial interface. In this regard, the DU and the CU may be connected through an optical fiber or UTP. For an implementation example, the DU and the CU may be connected through a UTP, but the present disclosure is not limited thereto.

In the baseband processor, signals for IQ data and control connected to an RF are transmitted through an interface between the DU and the CU. When the DU and the CU are connected through a UTP, power may be supplied from the CU to the DU at the same time as data communication using the Power-over-Ethernet (PoE) technology of the Ethernet. Furthermore, the CU can also control the power of the DU. The power of the DU must be supplied separately when PoE is not used, and a line for power supply is required separately from a line for data communication when the power of the DU must be controlled by the CU.

In order to implement a method according to the present specification, an interface format between the DU and the CU may be implemented in the 10 Gbps Ethernet standard, but the present disclosure is not limited thereto. Through this, it may be configured to transmit IQ data and control signals. In addition, a PoE function may be applied to implement the power of the DU to be directly supplied from the CU through an UTP line.

For a system applied to a vehicle, it is necessary to design and manufacture a distributed antenna system in consideration of high reliability. Meanwhile, even in such a distributed antenna system, various fault symptoms may appear during operation. The fault symptom may include a malfunction due to a defective and deteriorated part, a fault due to a physical cause such as an accident, and the like. In addition, a fault symptom may appear due to various causes, such as a system malfunction due to electromagnetic interference, a system function failure due to vehicle flooding and fire, and a system malfunction due to extreme environments. An action such as replacement or repair can be made for a fault that has occurred over a sufficient period of time, but it is necessary to maintain communication by attempting to automatically recover a fault within a system for a sudden fault symptom. In particular, in an emergency situation such as a vehicle accident, the need for fault recovery increases.

In the present specification, a system structure and an operation method that automatically recover a fault of a distributed antenna system installed in a vehicle through an optimal method for each symptom are proposed.

As illustrated in FIG. 4 and (b) of FIG. 9, a distributed antenna system is configured by physically separating the RF and the baseband by adding a DU and a CU between the RF and the baseband. The CU and the DUs constituting the distributed antenna system transmit IQ data between the RF and the baseband and also transmit control data for RF control. In the present specification, a method for detecting and automatically recovering a fault that may occur in individually separated RF-DUs is proposed.

In this regard, an RF-DU of the distributed antenna system may independently operate to cause a fault. As described above, a fault symptom may include a malfunction due to a defective and deteriorated part, a fault due to a physical cause such as an accident, and the like. In addition, a fault symptom may appear due to various causes, such as a system malfunction due to electromagnetic interference, a system function failure due to vehicle flooding and fire, and a system malfunction due to extreme environments. An action such as replacement or repair can be made for a fault that has occurred over a sufficient period of time, but it is necessary to maintain communication by attempting to automatically recover a fault within a system for a sudden fault symptom. In particular, in an emergency situation such as a vehicle accident, the need for fault recovery increases.

Figure 10:
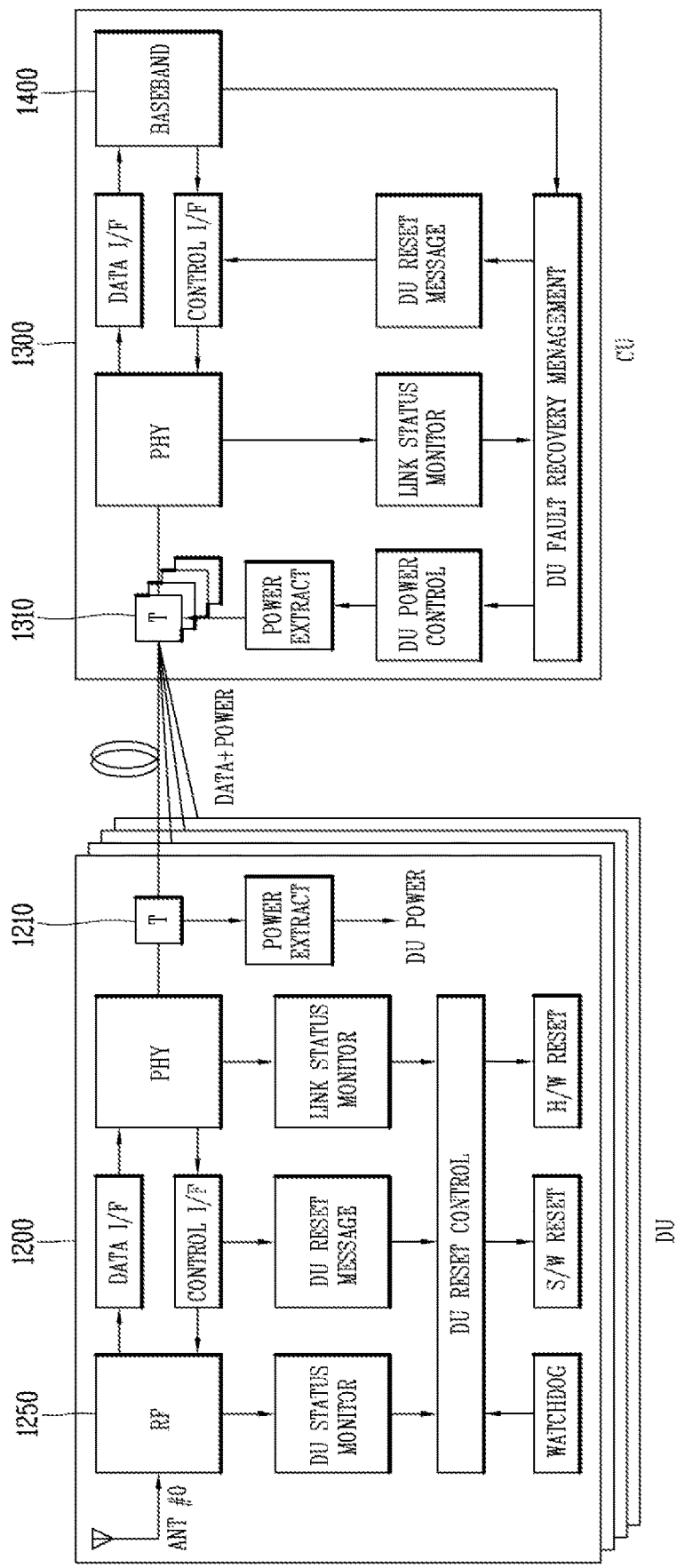
FIG. 10 shows a detailed block diagram of a distributed unit (DU) and a central unit (CU) according to the present specification.

On the other hand, FIG. 10 shows a detailed block diagram of a distributed unit (DU) and a central unit (CU) according to the present specification. A configuration in which the DU and the CU are connected in FIG. 10 is implemented by a configuration in which the CU is connected to N DUs as shown in (b) of FIG. 9.

Referring to FIGS. 9 and 10, each DU 1200 may include a power distributor 1210, a DU controller 1220, and an RF module 1250. In this regard, the DU controller 1220 of FIG. 9 may include a DU status monitor, a DU reset message controller, a link status monitor, and a DU reset controller in FIG. 10. Furthermore, the DU controller 1220 of FIG. 9 may further include a watchdog timer, a software reset controller, and a hardware reset controller in FIG. 10.

The software reset controller and the hardware reset controller may be controlled to perform a software reset and a hardware reset of the DU. Power supplied to a DU and each component of the DU may be cut off or hardware settings may be reset by a hardware reset of the DU. The settings of a DU and each component of the DU may be initialized by software by a software reset of the DU. For an example, the settings of a DU and each component of the DU may be initialized by software by resetting the board using a watchdog timer. For another example, a software reset may be performed by executing a control program associated with the software reset or calling a function that performs a specific function.

Referring to FIGS. 9 and 10, the CU 1300 may include a power injector 1310, a CU controller 1320 and a baseband processor 1400. The DU controller 1220 of FIG. 9 may include a DU power controller, a link status monitor, a DU reset message controller, and a DU fault recovery manager in FIG. 10. Meanwhile, data and power may be provided to the CU 1300 and the plurality of DUs 1200 through the power distributor 1210 and the power injector 1310.

As in an implementation example shown in the block diagram of FIG. 10, configurations and functions for the CU and the DU may be added to automatically recover a fault symptom. The CU requires a function to control DU power, a function to monitor a link connected to the DU, a DU management function, and the like. Meanwhile, the DU requires a CU link function, a DU management function, a H/W and S/W reset function, an RF device monitoring function, and the like.

The DU must be able to monitor a link status connected to the CU and perform a power-on-reset hardware (H/W) reset when the link does not return to a normal status, that is, in an up status, for a predetermined period of time. In addition, a reset operation must be performed when DU activation is not completed within a predetermined period of time, when a reset message is received from the CU, or when required during the occurrence of a fault. In this regard, a hardware (H/W) or software (S/W) reset must be performed.

A fault due to physical damage cannot be easily recovered by itself, but otherwise can be recovered by a H/W reset or S/W reset depending on the type of a fault occurring in the DU. The H/W reset requires an initialization process during power-on, and its recovery time is longer than that of the S/W reset. The S/W reset only resets the DU controller and needs to carry out only an activation process to allow fast recovery.

In the present specification, a recovery method for a DU-related fault detected by the CU and a recovery method for a fault detected by the DU are proposed.

A distributed antenna system may include an RF-DU and a CU-Baseband modem, and all control may be performed by the baseband, but a fault may occur in a physically separated RF-DU for various reasons. In the present specification, a method capable of classifying a fault situation in the CU or the DU and taking an action accordingly to quickly recover a fault when a fault situation occurs in an RF-DU is proposed.

On the other hand, a fault recovery method in a communication device based on a distributed antenna according to the present specification will be described with reference to FIGS. 4 to 10. Meanwhile, an RF-DU of the distributed antenna system according to the present specification may independently operate to cause a fault. Although it has high reliability due to installation in a vehicle, a fault symptom may appear due to various causes, such as a system malfunction due to a defective and deteriorated part, a physical cause such as an accident, electromagnetic interference, a system function failure due to vehicle flooding and fire, and a system malfunction due to extreme environments. An action such as replacement or repair can be made for a fault that has occurred over a sufficient period of time, but it is necessary to maintain communication by attempting to automatically recover a fault within a system for a sudden fault symptom. In particular, it is further required for an emergency situation such as a vehicle accident.

A fault due to physical damage to a communication system can be easily recovered by itself, but otherwise can be recovered by a hardware (H/W) reset or software (S/W) reset depending on the type of a fault that temporarily occurs in the DU. The H/W reset requires an initialization process during power-on and its recovery time is longer than that of the S/W reset and the S/W reset only resets the DU controller and needs to carry out only an activation process, thereby allowing relatively fast recovery. The present disclosure proposes a recovery method for a DU-related fault detected by the CU and a recovery method for a fault detected by the DU.

Meanwhile, an aspect of the present specification is to provide a communication device having a distributed antenna at an end terminal level. Another aspect of the present specification is to provide a communication device having a digital serial interface between a distributed antenna and a communication modem.

Still another aspect of the present specification is to provide a communication device that selects an antenna having excellent reception quality from a plurality of distributed antennas to transmit and receive data. Yet still another aspect of the present specification is to provide a communication device that achieves consistent reliability when transmitting and receiving data using a plurality of distributed antennas. Still yet another aspect of the present specification is to provide a communication device that recovers loss of data when transmitting and receiving data between a communication modem and a distributed antenna.

In addition, yet still another aspect of the present specification is to provide a recovery method for a fault related to a distributed unit (DU) detected in a central unit (CU). Still yet another aspect of the present specification is to provide a recovery method for a fault detected in a distributed unit (DU).

Figure 11A:
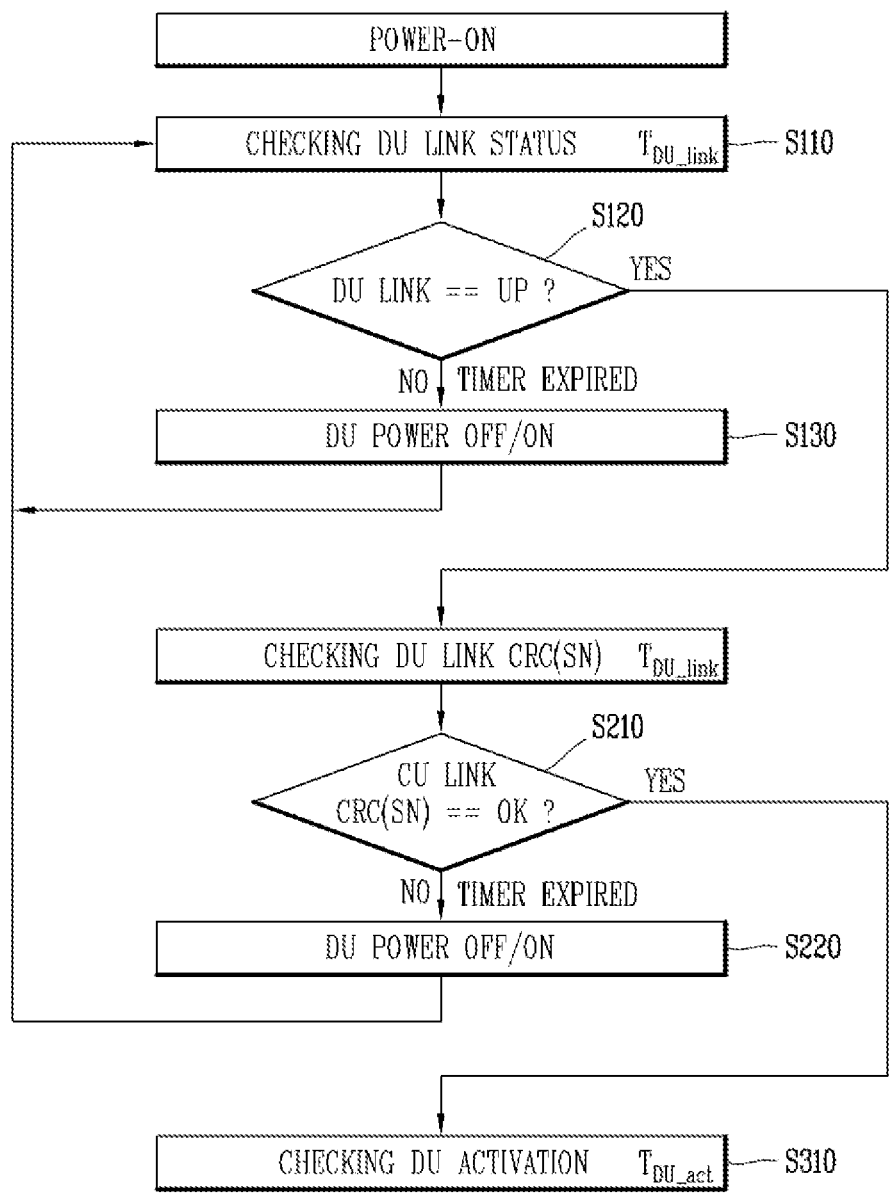
FIGS. 11A and 11B show flowcharts of a recovery method for a DU-related fault detected by a CU according to the present specification.
Figure 11B:
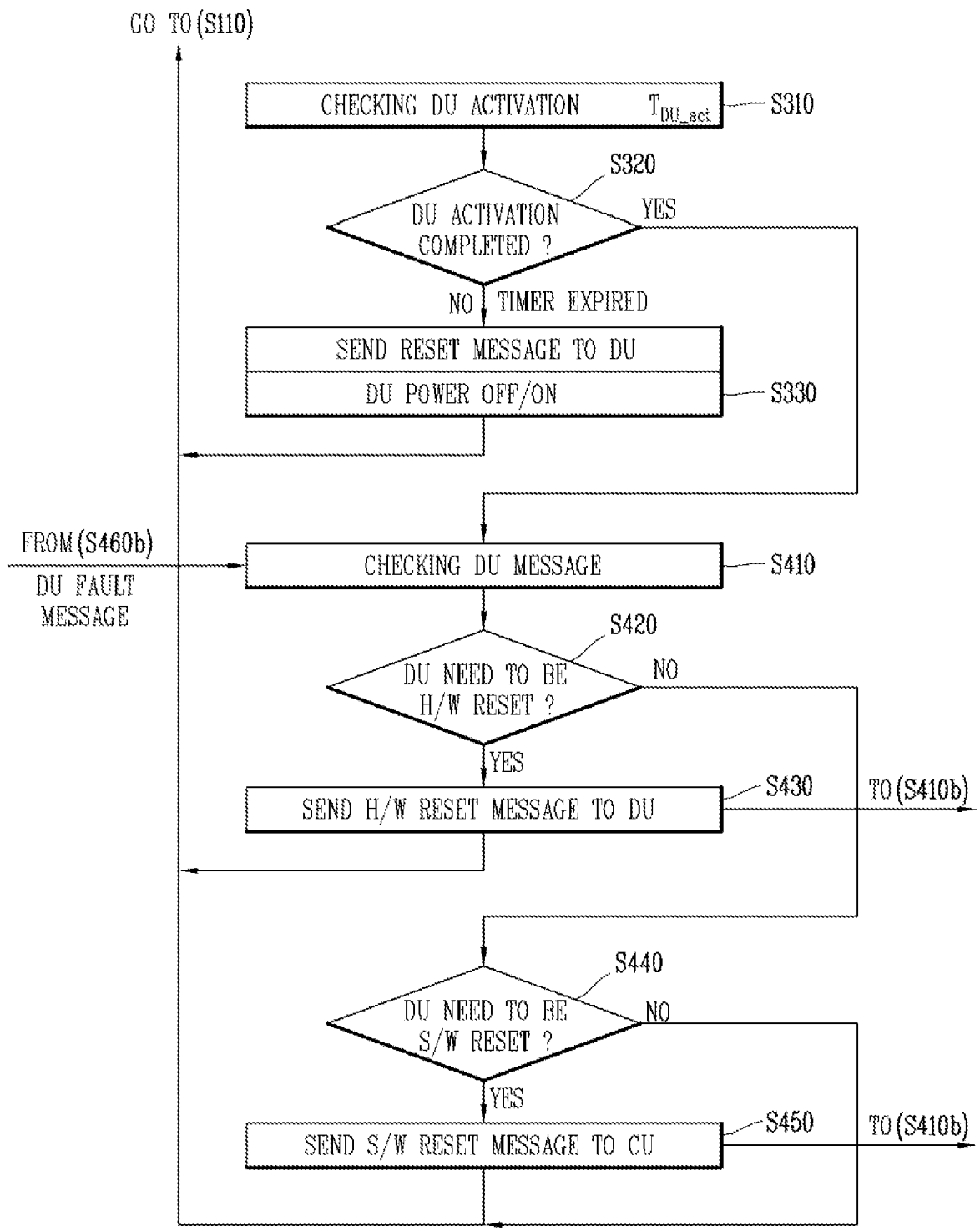
Figure 12A:
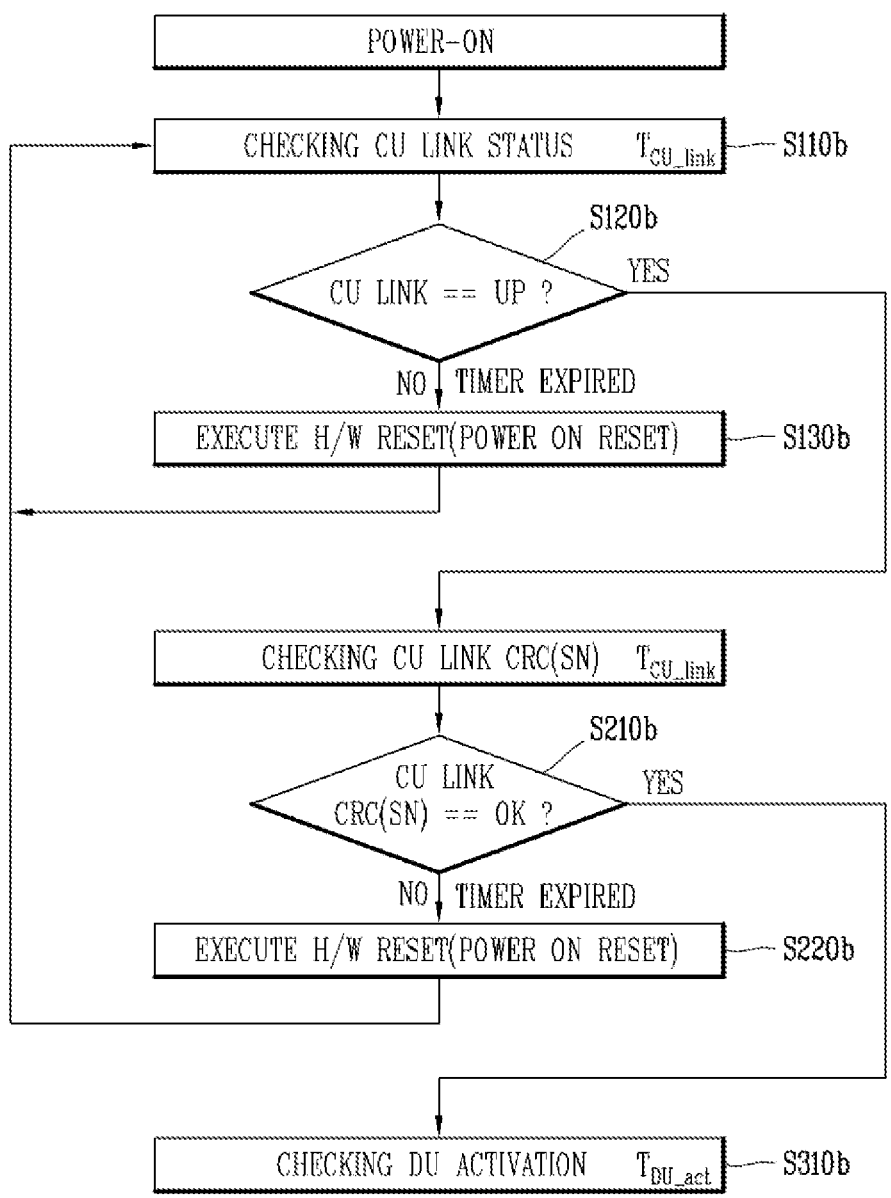
FIGS. 12A and 12B show flowcharts of a recovery method for a DU-related fault detected by a DU according to the present specification.
Figure 12B:
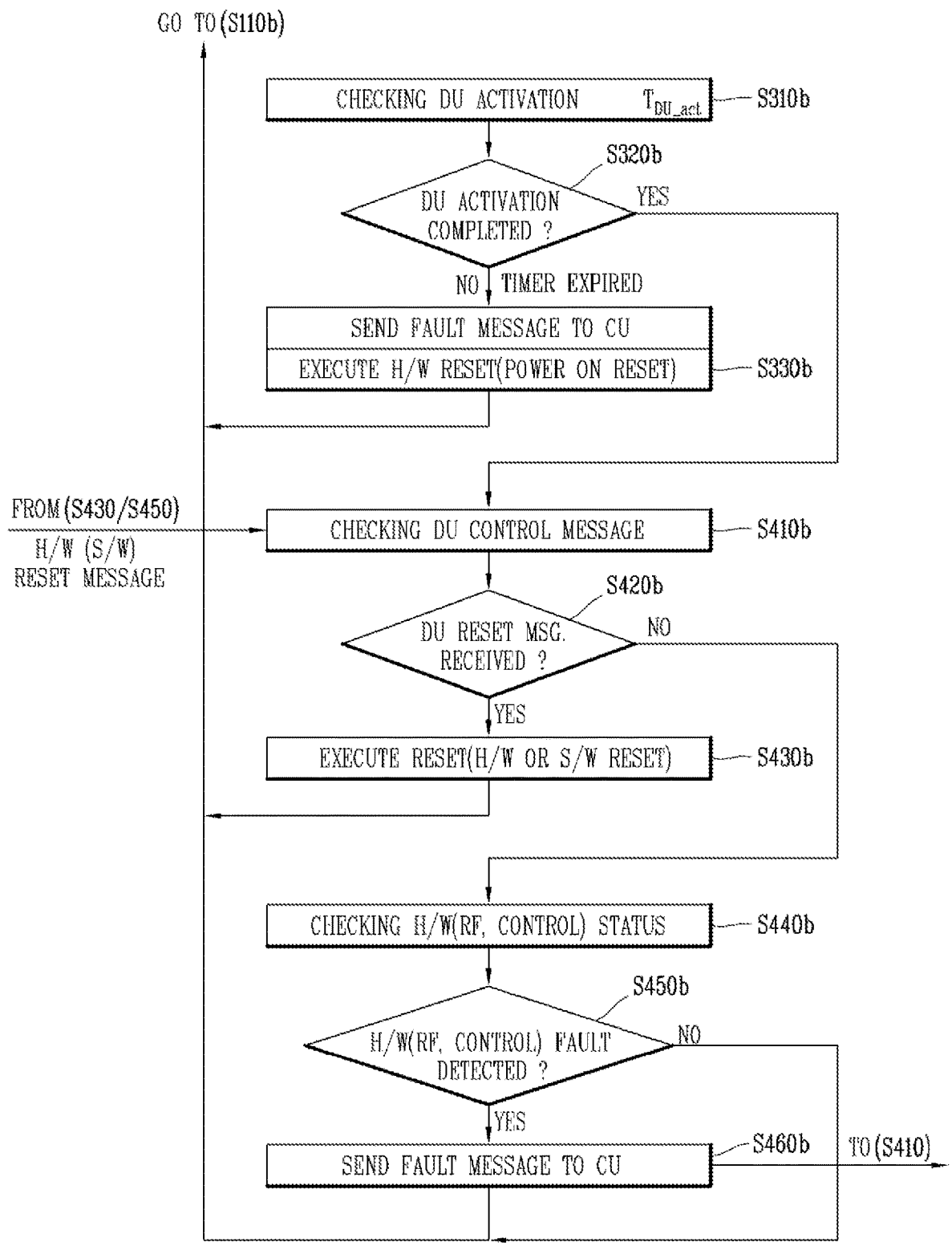

In relation to such a technical problem, FIGS. 11A and 11B show flowcharts of a recovery method for a DU-related fault detected by a CU according to the present specification. On the other hand, FIGS. 12A and 12B show flowcharts of a recovery method for a DU-related fault detected by a DU according to the present specification.

In this regard, it may be recovered through a software reset or a hardware reset according to the type of a fault occurring in the DU. Accordingly, it may be possible to determine and perform a recovery method required for fast and accurate recovery according to the fault situation.

Referring to FIGS. 4, 9, 10, 11A and 11B, an operating method in the CU may be summarized as follows.

1) When a DU link is in an abnormal status, that is, in a down status, while a set timer $T_{DU\_link}$ is terminated in the CU, the power of the corresponding DU is cut off and then supplied. (A CU Timer implemented in the present specification may be designed to be greater than a sum of all timers in the DU. This is to guarantee an operation time required for the recovery of the DU). In this regard, the CU checks a DU link status (S110). A DU link and a CU link are logically one single path, but may be physically different paths. Alternatively, the DU link and the CU link may be physically one single path. Even in the case of such a single path, an isolation may be secured between a DU link from the CU to the DU and a CU link from the DU to the CU.

Meanwhile, the CU may determine whether the DU link is in an abnormal status during an operation time of the timer $T_{DU\_link}$ associated with a DU link connection (S120). When the DU link is in an abnormal status, the distributed unit corresponding to the DU link may be controlled to cut off power (S130).

2) When a CRC error or SN (Sequence Number) mismatch above a threshold value is detected in the DU link within a predetermined period of time, the power of the corresponding DU is cut off and then supplied. In this regard, the CU may determine whether a CRC error or SN mismatch above a threshold value has occurred within a predetermined period of time (S210). When a CRC error or SN mismatch above a threshold value occurs within a predetermined period of time and the link is not in a normal status, the power to the DU may be cut off (S220).

3) When activation is not completed while a set timer $T_{DU\_act}$ is terminated after the DU link becomes a normal status, that is, an up status, the power of the corresponding DU is cut off and then supplied or a reset message is transmitted to the DU. In this regard, when a CRC error or SN mismatch above the threshold value does not occur and the link is in a normal status, the activation of the DU is checked (S310) and it is determined whether the activation of the DU is not completed (S320). When DU activation is not completed, a reset message is transmitted to the corresponding DU to cut off the power to the corresponding DU (S330).

4) When a fault message is received from the DU, a necessary reset procedure is determined according to the type of the occurred fault and a H/W or S/W reset message is transmitted to the DU. For an implementation example of the present specification, a H/W reset of the corresponding DU is carried out when it is an RF fault, and a S/W reset is carried out to achieve fast recovery when it is a fault of the controller. In this case, when the fault is not cleared even after performing the S/W reset, a H/W reset is carried out or the power of the corresponding DU is switched from an off status to an on status to restart the DU.

In this regard, the CU receives and checks a DU message such as a fault message from the DU (S410). When a DU message is received, the CU may perform a corresponding operation according to a type of the message type and information included in the message. Upon receiving a fault message, the CU determines whether the corresponding DU needs to be hardware reset based on the fault message (S420). A DU fault message transmitted from the DU may be received in step S460b of FIG. 12B.

When it is determined that the DU needs to be hardware reset, the CU may transmit a hardware reset message to the corresponding DU (S430). Meanwhile, when it is determined that the corresponding DU does not need to be reset by hardware, it is determined whether the corresponding DU needs to be reset by software based on the fault message (S440). When it is determined that the corresponding DU needs to be reset by software, the CU may transmit a software reset message to the corresponding DU (S450). In this regard, based on the hardware reset message transmitted to the DU in step S430 and the software reset message transmitted to the DU in step S450, steps below the DU control message check step (S410) of FIG. 12B may be performed.

The CU may perform the above-described operations 1) to 4) after being powered on. Meanwhile, in relation to the operations of 1) to 4) described above, the CU may perform DU power on/off control, DU link status monitoring, and DU activation control.

On the other hand, referring to FIGS. 4, 9, 10, 12A and 12B, an operating method in the DU may be summarized as follows.

1) When the CU link is in an abnormal status, that is, a down status, while a set timer $T_{CU\_link}$ (which is set to be shorter than the CU Timer) is terminated in the distributed unit (DU), a H/W reset (power-on reset) is performed. In this regard, the DU checks a CU link status after being powered on (S110b). As described above, a DU link and a CU link are logically one single path, but may be physically different paths. Alternatively, the CU link and the DU link may be physically one single path. Even in the case of such a single path, an isolation may be secured between a CU link from the DU to the CU and a DU link from the CU to the DU.

Furthermore, the DU may determine whether the CU link is in an abnormal status before a third timer $T_{CU\_link}$ determined in the DU is terminated (S120b). When the CU link is in an abnormal status, the DU may perform a hardware reset (S130b).

2) When a CRC error or SN (Sequence Number) mismatch above a threshold value is detected in a CU link within a predetermined period of time, a H/W reset is performed after transmitting a fault message to the CU. In this regard, the DU may determine whether a CRC error or SN mismatch above a threshold value has occurred within a predetermined period of time (S210b). When a CRC error or SN mismatch above a threshold value occurs within a predetermined period of time, a hardware reset may be performed to cut off power (S220b).

3) When activation is not completed while a set timer $T_{DU\_act}$ is terminated after the CU link becomes a normal status, that is, an up status, a S/W reset is performed (after transmitting a fault message to the CU). In this regard, when a CRC error or SN mismatch above the threshold value does not occur and the link is in a normal status, the activation of the DU is checked (S310b) and it is determined whether the activation of the DU is not completed (S320b). When DU activation is not completed, a fault message is transmitted to the CU to execute a software reset so as to cut off power (S330b).

4) When a reset message is received from the CU, a H/W or S/W reset is performed according to the message received within a predetermined period of time. In this regard, the DU receives and checks a DU control message such as a reset message from the CU (S410b). In this regard, based on the hardware reset message transmitted to the DU in step S430 and the software reset message transmitted to the DU in step S450, steps below the DU control message check step (S410) of FIG. 12B may be performed. When a DU control message is received, the DU may perform a corresponding operation according to a type of the message type and information included in the message. Upon receiving the reset message (S420b), the DU performs a hardware reset or a software reset based on the reset message (S430b).

5) When an error in the RF or controller of the DU is detected, a fault message is transmitted to the CU, and a H/W or S/W reset is performed according to the reset message received from the CU. In this regard, when a DU control message such as a reset message is not received, the DU receives and checks a hardware status message such as RF control from the CU (S440b). When a hardware control message is received, the DU may perform a corresponding operation according to a type of the message type and information included in the message. When a hardware status message such as RF control is detected (S450b), the DU may transmit a fault message to the CU (S460b). Based on the DU fault message transmitted to the CU in step S460b of FIG. 12B, steps below the DU message check step S410 of FIG. 11B may be performed.

6) The controller of the DU updates a watchdog timer at regular time intervals to prevent a malfunction of the controller, and transmits a fault message to the CU and performs a S/W reset to restore the operation when the watchdog timer expires.

The DU may perform the above-described operations 1) to 6) after being powered on. Meanwhile, in relation to the operations of 1) to 6) described above, the DU may perform CU link status monitoring, DU activation control, hardware (H/W) reset, software (S/W) reset, and RF device status monitoring.

Referring to the above-described FIGS. 1 to 12B, a communication device having a plurality of distributed units (DUs) and a central unit (CU) to be claimed in the present specification and a method of operating the same, that is, a power control method, will be described in detail. In this regard, the subject matter to be claimed in the present specification is not limited to the description below, and may be modified to include the above-described technical features, configurations, and operations.

A communication device may include a plurality of distributed units (DUs) and a central unit (CU). The plurality of distributed units DU1 to DUN may each include an antenna. Each of the antenna elements of the plurality of distributed units DU1 to DUN may be arranged at different locations of the communication device to perform multiple-input multiple-output (MIMO) or diversity.

The central unit (CU) may be configured to include a baseband modem. The central unit (CU) may be spaced apart from each of the plurality of distributed units DU1 to DUN. The central unit (CU) may be configured to be connected to each of the plurality of distributed units DU1 to DUN through a plurality of DU links.

The central unit (CU) may be configured to measure a channel quality of each of the plurality of DU links. When it is determined that a DU link is in an abnormal status during an operation time of the timer $T_{DU\_link}$ associated with a DU link connection in the central unit, the central unit (CU) may control power to be cut off to a distributed unit corresponding to the DU link. Furthermore, when it is determined that the DU link has returned to a normal status, the central unit (CU) may control power to be supplied to a distributed unit corresponding to the DU link. Accordingly, the CU may cut off or supply power to the DU according to a distribution path abnormal or normal status.

Meanwhile, power to the DU according to a CRC error or an SN mismatch may be cut off or supplied. In this regard, the central unit (CU) may cut off the power of the distributed unit corresponding to the DU link when a CRC error or a sequence number (SN) mismatch above a threshold value is detected in the DU link. In addition, the central unit (CU) may supply power to the distributed unit corresponding to the DU link when the CRC error or the SN mismatch below a threshold value is detected.

Meanwhile, the CU may determine whether the activation of the DU is completed, and determine whether to cut off power to the DU. In this regard, the central unit (CU) may determine whether the activation of the distributed unit is completed during an operation time of a second timer $T_{DU\_act}$ associated with the activation of the DU link after the DU link becomes a normal status. When it is determined that the activation of the distributed unit is not completed, the central unit (CU) may control power to be cut off to the distributed unit corresponding to the DU link or transmit a reset message to the distributed unit.

Furthermore, the CU may determine a reset procedure according to the type upon receiving a fault message and transmit the determined reset procedure to the DU. In this regard, when a fault message is received from the distributed unit, the central unit (CU) may determine whether the RF module and the controller have a fault according to the type of the fault message. When it is determined that the RF module has a fault, the central unit (CU) may control the distributed unit to perform a hardware reset of the distributed unit. When it is determined that the controller has a fault, the central unit (CU) may control the distributed unit to perform a software reset of the distributed unit. In addition, when the fault is not cleared after the software reset of the distributed unit is performed, the central unit (CU) may carry out a hardware reset of the distributed unit or cut off power of the distributed unit.

Hereinafter, a power supply control process in the DU will be described. In this regard, when the CU link is in an abnormal status before the third timer $T_{CU\_link}$ is terminated, the DU may perform a hardware (H/W) reset by itself. Accordingly, the distributed unit (DU) may perform a hardware reset when the CU link is in an abnormal status before the third timer $T_{CU\_link}$ determined by the distributed unit is terminated. In this regard, the operation time of the third timer $T_{CU\_link}$ may be set to be shorter than the operation time of the timer $T_{DU\_link}$ associated with a DU link connection.

Meanwhile, power cut-off or supply may be performed according to a CRC error or an SN mismatch. In this regard, the distributed unit (DU) may transmit a fault message to the central unit (CU) and perform a hardware reset when a CRC error or sequence number (SN) mismatch above a threshold value is detected in the DU link.

Meanwhile, it may be determined whether the activation of the DU is completed to determine whether to cut off power to the DU. In this regard, the distributed unit (DU) may determine whether the activation of the distributed unit is completed during an operation time of the second timer $T_{DU\_act}$ associated with the activation of the DU link after the CU link becomes a normal status. Meanwhile, when it is determined that activation of the distributed unit (DU) is not completed, the distributed unit (DU) may perform a software reset.

Meanwhile, upon receiving a reset message, a hardware reset or a software reset may be performed depending on the type. In this regard, when a reset message is received from the central unit (CU), the distributed unit (DU) may perform a hardware reset or a software reset according to the type of the reset message. Meanwhile, the distributed unit (DU) may transmit a fault message to the central unit (CU) when an error in the RF module or the controller is detected. Furthermore, depending on the type of the reset message received from the CU, the distributed unit (DU) may perform a hardware reset or a software reset.

Meanwhile, the distributed unit (DU) may transmit a fault message and perform a software reset based on an internal watchdog timer. In this regard, the distributed unit (DU) may update the watchdog timer to prevent a malfunction of the controller. When the watchdog timer expires, the distributed unit (DU) may transmit a fault message to the central unit (CU) and perform a software reset.

Meanwhile, an operating method according to the present specification may be configured to transmit a report message when communication between the DU and the CU is allowed. In this regard, the distributed unit (DU) may determine whether the quality of the CU link is below a threshold value before the third timer $T_{CU\_link}$ is terminated. When the quality of the CU link is below the threshold value, the distributed unit (DU) may control to transmit a report message through a DU link thereof or a DU link of another distributed unit.

Accordingly, the central unit (CU) may configure a specific distributed unit not to be included or exclude resource allocation for the specific distributed unit based on the report message. In this regard, upon receiving a report message from a specific distributed unit, the central unit (CU) may exclude resource allocation for the specific distributed unit and a DU link associated with the specific distributed unit.

Meanwhile, connections between the central unit (CU) and the N distributed units DU1 to DUN according to the present specification may be connected through a digital serial interface. In this regard, the central unit (CU) may control to exclude resource allocation for a specific distributed unit from which the report message is received and a DU link associated with the specific distributed unit. During transmission (Tx), the central unit (CU) may generate, as a Tx packet, a Tx data signal and an RF control signal which are input, by using a signal processing (SP) framer in each of one or more SP paths. In addition, the central unit (CU) may select one of the one or more SP paths and provide the Tx packet through the selected SP path to the remaining distributed unit of a distribution path mapped to the selected SP path.

Figure 13:
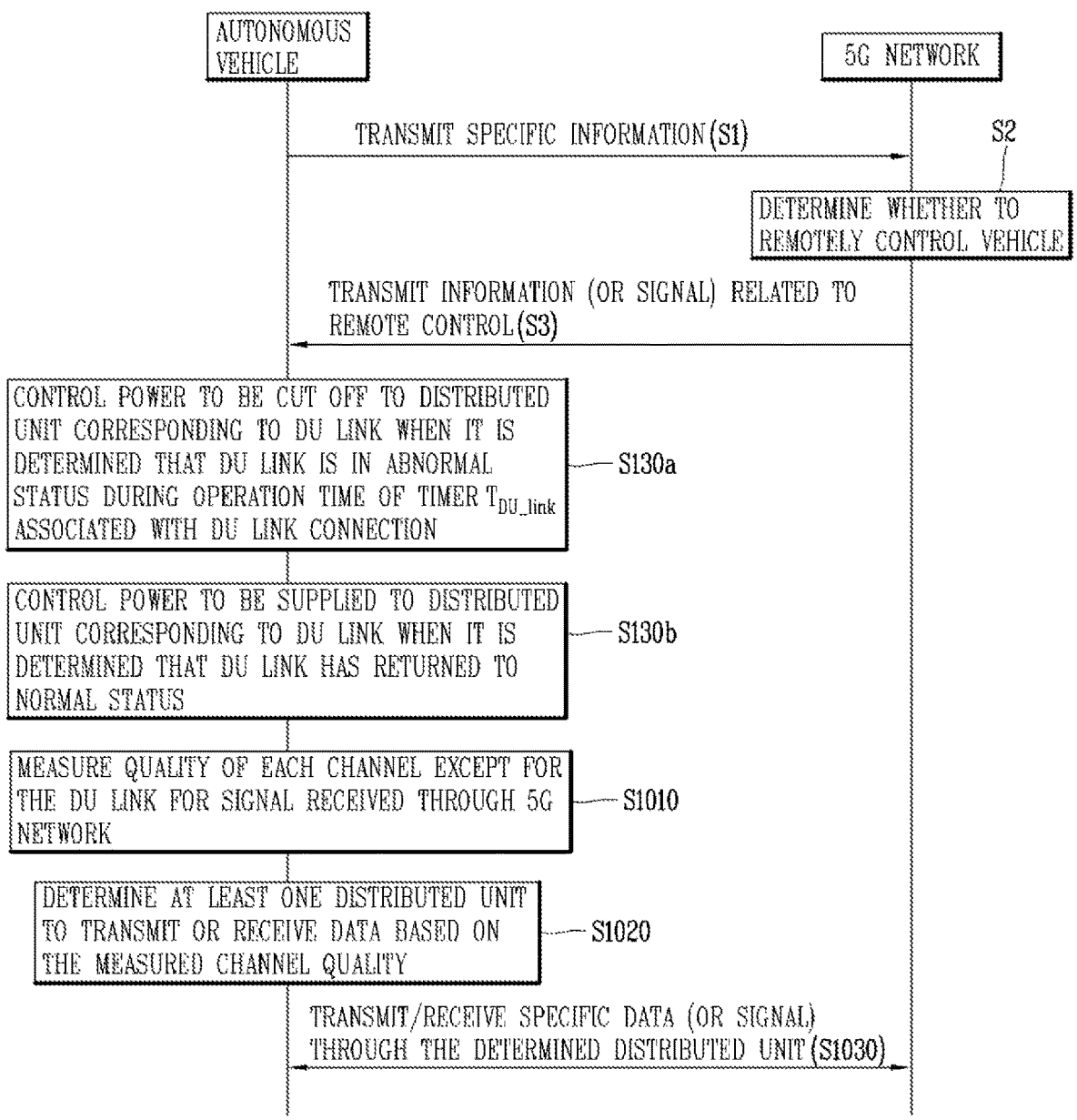
Referring to FIGS. 13 and 14, an operation process of a communication device disposed in a vehicle (including an autonomous vehicle) will be described.
Figure 14:
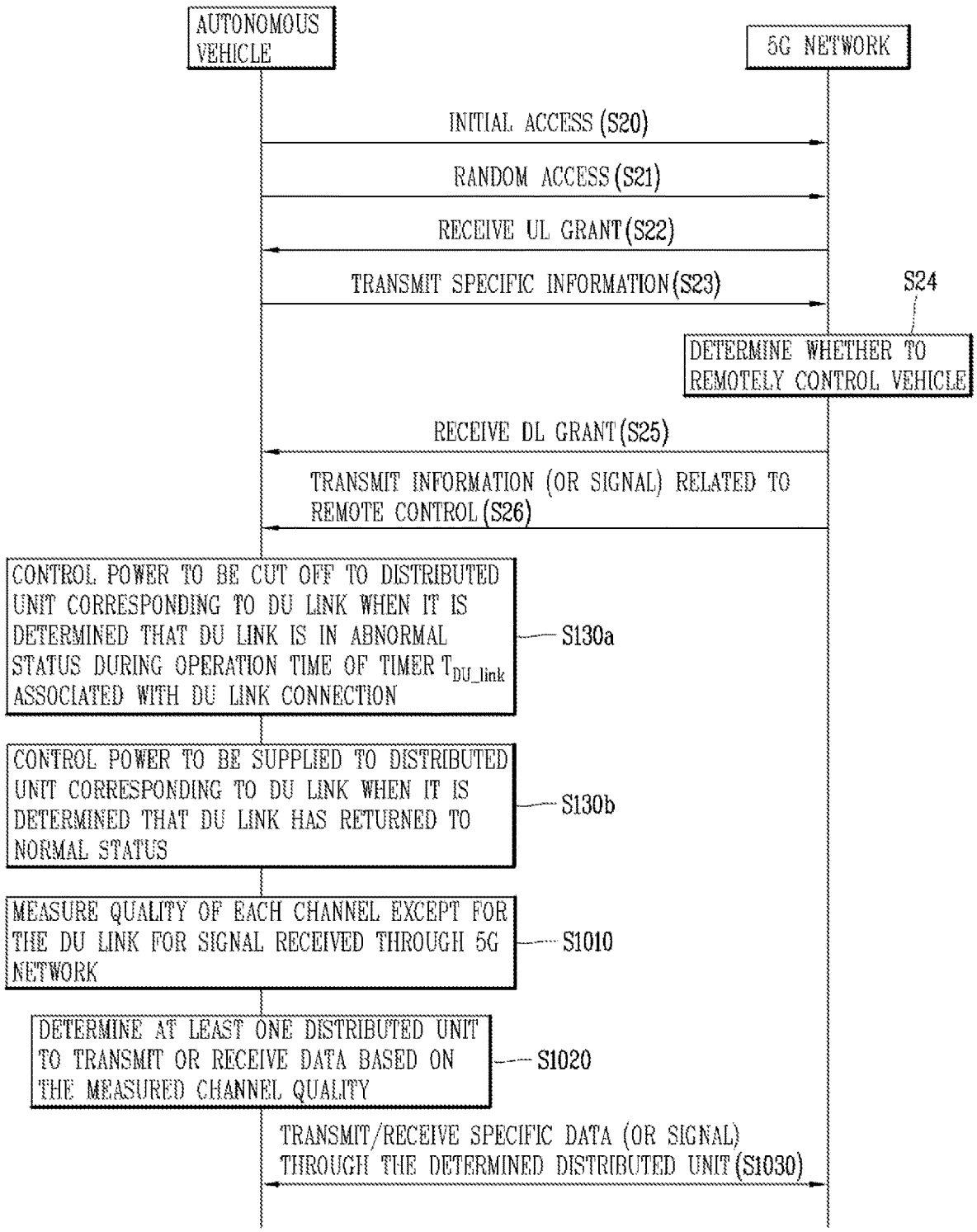

Referring to FIGS. 13 and 14, an operation process of a communication device disposed in a vehicle (including an autonomous vehicle) will be described. For explanation, the communication device will be replaced with an autonomous vehicle.

In this regard, FIGS. 13 and 14 are sequence diagrams for explaining the operation of a communication device mounted on an autonomous vehicle according to an embodiment of the present disclosure.

First, FIG. 13 shows an example of a basic operation of an autonomous vehicle and a 5G network in a 5G communication system. In this regard, the aforementioned communication device may be mounted on an autonomous vehicle.

The autonomous vehicle transmits specific information to a 5G network (S1).

The specific information may include information related to autonomous driving.

The information related to autonomous driving may be information directly related to vehicle driving control. For example, the information related to autonomous driving may include at least one of object data indicating objects around the vehicle, map data, vehicle status data, vehicle location data, and driving plan data.

The autonomous driving related information may further include service information necessary for autonomous driving. For example, the specific information may include information on a destination input through a user terminal and a safety level of a vehicle. Furthermore, the 5G network may determine whether to remotely control the vehicle (S2).

Here, the 5G network may include a server or module that performs remote control related to autonomous driving.

Furthermore, the 5G network may transmit information (or signals) related to remote control to the autonomous vehicle (S3).

As described above, the information related to remote control may be a signal directly applied to the autonomous vehicle, or may further include service information required for autonomous driving.

The autonomous vehicle may measure a channel quality of a distributed path and determine a distributed unit (DU) based on the measured channel quality (S4). Then, when it is determined that a DU link is in an abnormal status during an operation time of the timer Tau associated with a DU link connection, the autonomous vehicle may control power to be cut off to a distributed unit corresponding to the DU link (S130a). In addition, when it is determined that the DU link has returned to a normal status, the autonomous vehicle may control power to be supplied to the distributed unit corresponding to the DU link (S130b). A detailed control operation related thereto may refer to the control process of FIGS. 11A and 11B.

Meanwhile, the central unit (CU) of the autonomous vehicle may measure the quality of each channel except for the DU link for a signal received through the 5G network (S1010). Furthermore, the central unit (CU) may determine at least one distributed unit to be used for transmitting or receiving data based on the measured channel quality (S1020). Accordingly, specific data (or signals) from the 5G network may be transmitted or received through the determined distributed unit (S1030).

In this regard, steps S130 to S1020 may be performed before a step in which the autonomous vehicle transmits specific information to the 5G network (S1). Accordingly, after determining at least one distributed unit to transmit data in step S1020, specific information may be transmitted to the 5G network (S1).

For another example, steps S130 to S1020 may be performed after the autonomous vehicle transmits specific information to the 5G network (S1). Accordingly, after determining at least one distributed unit to transmit data in step S1020, information (or signals) related to control may be received from the 5G network (S3).

FIG. 14 schematically illustrates an essential process for 5G communication between an autonomous vehicle and a 5G network (e.g., an initial access procedure between a vehicle and a 5G network, etc.) according to an embodiment of the present disclosure.

First, FIG. 14 shows an example of an application operation between an autonomous vehicle and a 5G network in a 5G communication system.

The autonomous vehicle performs an initial access procedure with the 5G network (S20).

The initial access procedure includes a cell search for obtaining a downlink (DL) operation, a process for obtaining system information, and the like.

Furthermore, the autonomous vehicle performs a random-access procedure with the 5G network (S21).

The random-access process may include preamble transmission and random-access response reception processes for uplink (UL) synchronization acquisition or UL data transmission.

Furthermore, the 5G network transmits a UL grant for scheduling the transmission of specific information to the autonomous vehicle (S22).

The UL Grant reception includes a process of receiving time/frequency resource scheduling for the transmission of UL data to a 5G network.

Furthermore, the autonomous vehicle transmits specific information to the 5G network based on the UL grant (S23).

Furthermore, the 5G network determines whether to remotely control the vehicle (S24).

Furthermore, the autonomous vehicle receives a DL grant through a physical downlink control channel to receive a response to specific information from the 5G network (S25).

Furthermore, the 5G network transmits information (or signals) related to remote control to the autonomous vehicle based on the DL grant (S26).

Then, when it is determined that a DU link is in an abnormal status during an operation time of the timer $T_{DU\_link}$ associated with a DU link connection, the autonomous vehicle may control power to be cut off to a distributed unit corresponding to the DU link (S130a). In addition, when it is determined that the DU link has returned to a normal status, the autonomous vehicle may control power to be supplied to the distributed unit corresponding to the DU link (S130b). A detailed control operation related thereto may refer to the control process of FIGS. 12A and 12B.

Meanwhile, the central unit (CU) of the autonomous vehicle may measure the quality of each channel except for the DU link for a signal received through the 5G network (S1010). Furthermore, the central unit (CU) may determine at least one distributed unit to be used for transmitting or receiving data based on the measured channel quality (S1020). Accordingly, specific data (or signals) from the 5G network may be transmitted or received through the determined distributed unit (S1030).

In this regard, steps S130 to S1020 may be performed after the initial access (S20) but before the step of transmitting, by the autonomous vehicle, specific information to the 5G network (S23). Accordingly, after determining at least one distributed unit to transmit data in step S1020, specific information may be transmitted to the 5G network (S23).

For another example, steps S130 to S1020 may be performed after the autonomous vehicle transmits specific information to the 5G network (S23). Accordingly, after determining at least one distributed unit to transmit data in step S1020, information (or signals) related to control may be transmitted from the 5G network (S23).

Figure 15:
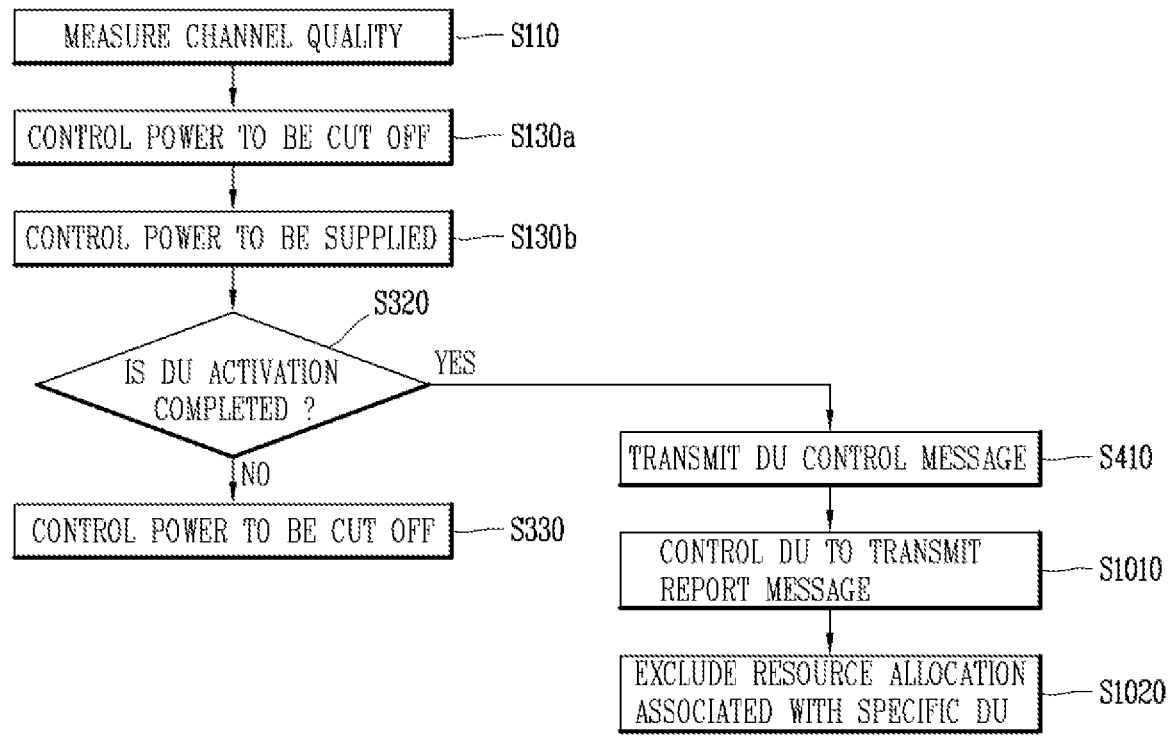
FIG. 15 is a flowchart of an operating method performed by a central unit (CU) of a communication device according to the present specification.
Figure 16:
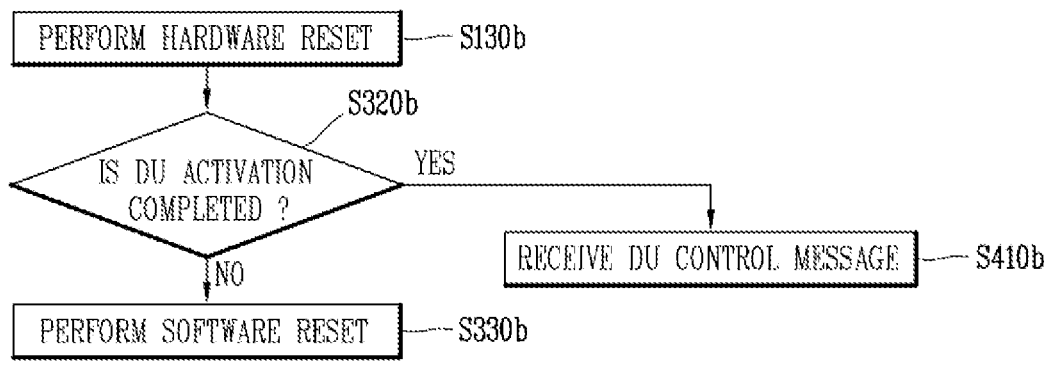
FIG. 16 is a flowchart of an operating method performed by a distributed unit (DU) of a communication device according to the present specification.

In the above, a communication device and a vehicle mounted with the communication device according to an aspect of the present specification have been described. Hereinafter, a method of operating a communication device according to another aspect of the present specification will be described. In this regard, FIG. 15 is a flowchart of an operating method performed by a central unit (CU) of a communication device according to the present specification. On the other hand, FIG. 16 is a flowchart of an operating method performed by a distributed unit (DU) of a communication device according to the present specification.

A method of operating a communication device will be described in detail with reference to FIGS. 11A to 12B and FIG. 15. In this regard, the method of operating a communication device is not limited to the following description, and may be modified and expanded in combination with the above-described technical features, configurations, and operations.

Referring to FIGS. 11A to 12B and 15, the method of operating a communication device may include a channel quality measurement step (S110), a power cut-off control step (S130a), and a power supply control step (S130b).

In the channel quality measurement step (S110), channel quality may be measured for a plurality of DU links that are one-to-one coupled to each of a plurality of distributed units (DUs) each including an antenna.

When it is determined that the DU link is in an abnormal status during an operation time of the timer $T_{DU\_link}$ associated with a DU link connection, the central unit may control power to be cut off to a distributed unit corresponding to the DU link in the power cut-off control step (S130a). Meanwhile, when it is determined that the DU link has returned to a normal status, power may be controlled to be supplied to a distributed unit corresponding to the DU link in the power supply control step (S130b).

The method of operating a communication device may further include a DU activation determination step (S320) and a DU power cut-off control step (S330). In the DU activation determination step (S320) it may be determined whether the activation of the distributed unit is completed during an operation time of the second timer $T_{DU\_act}$ associated with the activation of the DU link after the DU link becomes a normal status. When it is determined that the activation of the distributed unit (DU) is not completed, power may be controlled to be cut off to a distributed unit corresponding to the DU link in the power cut-off control step (S330). Alternatively, a reset message may be transmitted to the distributed unit in the power cut-off control step (S320). When it is determined that the activation of the DU is completed, the CU may transmit a DU control message (S410) to perform DU control.

A method of operating a communication device will be described in detail with reference to FIGS. 11A to 12B and FIG. 16. In this regard, the method of operating a communication device is not limited to the following description, and may be modified and expanded in combination with the above-described technical features, configurations, and operations.

The method of operating a communication device performed by the distributed unit (DU) may further include a hardware reset step (S130b), a DU activation determination step (S320b), and a software reset execution step (S330b). In this regard, upon receiving the DU control message of FIG. 15, the DU may perform steps below the hardware reset execution step (S130b) of FIG. 16, but the present disclosure is not limited thereto.

In the hardware reset execution step (S130b), when a CU link is in an abnormal status before the third timer $T_{CU\_link}$ determined by the distributed unit is terminated, the distributed unit performs a hardware reset. In the DU activation determination step (S320b) it may be determined whether the activation of the distributed unit is completed during an operation time of the second timer $T_{DU\_act}$ associated with the activation of the DU link after the CU link becomes a normal status.

When it is determined that the activation of the distributed unit is not completed, a fault message may be transmitted to the CU, and a software reset may be performed in the software reset execution step (S330b). When it is determined that the activation of the DU is completed, the DU may receive a DU control message (S410b) and perform an operation corresponding to the control message. In this regard, upon receiving a reset message, a hardware reset or a software reset may be performed.

Referring to FIG. 15, the method of operating a communication device performed by the central unit (CU) may further include a report message transmission step (S1010a) and a resource allocation exclusion step (S1020a). In the report message transmission step (S1010a), when it is determined that the quality of a CU link is below a threshold value before the third timer $T_{CU\_link}$ is terminated, the central unit may control the distributed unit to transmit a report message. In this regard, the central unit may control the distributed unit to transmit a report message through the DU link or a DU link of another distributed unit. When the report message is received from a specific distributed unit, resource allocation for a specific distributed unit and a DU link associated with the specific distributed unit may be excluded in a resource allocation exclusion step (S1020a).

Meanwhile, the central unit (CU) of the autonomous vehicle may measure the quality of each channel except for the DU link for a signal received through the 5G network (S1010). Furthermore, the central unit (CU) may determine at least one distributed unit to be used for transmitting or receiving data based on the measured channel quality (S1020).

When the report message is received from a specific distributed unit, resource allocation for the specific distributed unit and a DU link associated with the specific distributed unit may be excluded in a resource allocation exclusion step (S1020a).

In the above, a communication device and a method of operating the same according to the present specification have been described. The technical effects of a communication device and a method of operating the same according to an embodiment of the present specification are as follows.

According to the present specification, a fault type of a DU detected by a CU may be classified to differently perform a recovery method according to the type, thereby allowing fast recovery according to the fault type.

According to the present specification, while communication with the CU is not maintained, the DU may monitor an activation status with a CU link by itself for recovery to be recovered by a function of restarting the DU.

According to the present specification, when a fault of the DU occurs in a distributed antenna system, it may be quickly recovered or excluded, thereby enhancing the reliability of vehicle communication.

According to the present specification, a structure for mounting an antenna system capable of operating in a broadband on a vehicle may be proposed to support various communication systems.

Further scope of applicability of the present disclosure will become apparent from the foregoing detailed description. It should be understood, however, that the detailed description and specific examples, such as the preferred implementation of the present disclosure, are given by way of illustration only, since various modifications and alternations within the spirit and scope of the disclosure will be apparent to those skilled in the art.

The present disclosure can be implemented as computer-readable codes in a program-recorded medium. The computer-readable medium may include all types of recording devices each storing data readable by a computer system. Examples of such computer-readable media may include hard disk drive (HDD), solid status disk (SSD), silicon disk drive (SDD), ROM, RAM, CD-ROM, magnetic tape, floppy disk, optical data storage element and the like. Also, the computer may include the master (MAS) of the communication device 100.

While specific embodiments of the present disclosure have been described and illustrated above, it will be understood by those skilled in the art that the present disclosure is not limited to the disclosed embodiments, and various changes and modifications may be made to the present disclosure without departing from the concept and scope of the present disclosure. Therefore, the scope of the present disclosure is not limited to the above-described embodiments, but shall be defined by the technical concept of the appended claims.

The present specification can be implemented as computer-readable codes in a program-recorded medium. The computer-readable medium may include all types of recording devices each storing data readable by a computer system. Examples of such computer-readable media may include hard disk drive (HDD), solid status disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The foregoing embodiments are merely exemplary and are not to be considered as limiting the present disclosure. The scope of the present specification should be determined by reasonable interpretations of the appended claims and all equivalents of the present specification belong to the scope of the present specification.

What is claimed is:

1. A communication device comprising:
a plurality of distributed units (DUs) each comprising an antenna; and
a central unit (CU) disposed apart from each of the plurality of distributed units and configured to be connected to each of the plurality of distributed units through a plurality of DU links,
wherein the central unit measures a channel quality of each of the plurality of DU links, controls power to be cut off to a distributed unit corresponding to a DU link when it is determined that the DU link is in an abnormal status during an operation time of a timer $T_{DU\_link}$ associated with a DU link connection in the central unit, and controls power to be supplied to the distributed unit corresponding to the DU link when it is determined that the DU link has returned to a normal status, and
wherein the distributed unit performs a hardware reset when a CU link is in an abnormal status before a third timer $T_{CU\_link}$ determined by the distributed unit is terminated, and
wherein the operation time of the third timer $T_{CU\_link}$ is set to be shorter than the operation time of the timer $T_{DU\_link}$ associated with the DU link connection.

2. The communication device of claim 1, wherein the central unit cuts off the power of the distributed unit corresponding to the DU link when a cyclic redundancy check (CRC) error or a sequence number (SN) mismatch above a threshold value is detected in the DU link, and supplies the power of the distributed unit corresponding to the DU link when the CRC error or the SN mismatch is detected to be below the threshold value.

3. The communication device of claim 1, wherein the central unit determines whether activation of the distributed unit is completed during an operation time of a second timer $T_{DU\_act}$ associated with the activation of the DU link after the DU link becomes a normal status, and controls power to be cut off to a distributed unit corresponding to the DU link or transmits a reset message to the distributed unit when it is determined that the activation of the distributed unit is not completed.

4. The communication device of claim 1, wherein when a fault message is received from the distributed unit, the central unit determines whether a radio frequency (RF) module and a controller have a fault according to a type of the fault message.

5. The communication device of claim 4, wherein the central unit controls the distributed unit to perform a hardware reset of the distributed unit when it is determined that the RF module has a fault, and controls the distributed unit to perform a software reset of the distributed unit when it is determined that the controller has a fault.

6. The communication device of claim 5, wherein the central unit carries out a hardware reset of the distributed unit or cuts off the power of the distributed unit when the fault is not cleared after the software reset of the distributed unit is performed.

7. The communication device of claim 1, wherein the distributed unit transmits a fault message to the central unit and performs a hardware reset when a cyclic redundancy check (CRC) error or a sequence number (SN) mismatch above a threshold value is detected in the DU link.

8. The communication device of claim 1, wherein the distributed unit determines whether activation of the distributed unit is completed during an operation time of a second timer $T_{DU\_act}$ associated with the activation of the DU link after the CU link becomes a normal status, and performs a software reset when it is determined that the activation of the distributed unit is not completed.

9. The communication device of claim 1, wherein the distributed unit performs a hardware reset or a software reset according to a type of a reset message when the reset message is received from the central unit.

10. The communication device of claim 9, wherein the distributed unit transmits a fault message to the central unit when an error of a radio frequency (RF) module or the controller is detected, and performs a hardware reset or a software reset according to the type of a reset message received from the CU.

11. The communication device of claim 10, wherein the distributed unit updates a watchdog timer to prevent a malfunction of the controller, transmits the fault message to the central unit and performs a software reset when the watchdog timer expires.

12. The communication device of claim 1, wherein the distributed unit controls a report message to be transmitted through the DU link or a DU link of another distributed unit when it is determined that the quality of the CU link is below a threshold value before the third timer $T_{CU\_link}$ is terminated.

13. The communication device of claim 12, wherein upon receiving the report message from a specific distributed unit, the central unit excludes resource allocation for the specific distributed unit and a DU link associated with the specific distributed unit.

14. The communication device of claim 12, wherein the central unit is connected to each of the plurality of distributed units through a digital serial interface, and
wherein the central unit excludes resource allocation for a specific distributed unit from which the report message has been received and a DU link associated with the specific distributed unit, generates, as a Tx packet, a Tx data signal and an RF control signal which are input, by using a signal processing (SP) framer in each of one or more SP paths during transmission (Tx), selects one of the one or more SP paths, and provides the Tx packet through the selected SP path to a remaining distributed unit of a distribution path mapped to the selected SP path.

15. The communication device of claim 1, wherein the communication device is mounted on a vehicle, and
wherein when it is determined that the DU link is in an abnormal status, the central unit controls power to be cut off to a specific distributed unit corresponding to the DU link, excludes communication resource allocation for the specific distributed unit, measures the quality of each channel except for the DU link for a signal received through a 5G network, and determines at least one distributed unit to be used to transmit or receive data based on the measured channel quality.

16. A method of operating a communication device, the method comprising:
a channel quality measurement step of measuring channel quality for a plurality of DU links that are one-to-one coupled to each of a plurality of distributed units (DUs) each comprising an antenna;
a power cut-off control step of controlling power to be cut off to a distributed unit corresponding to a DU link when it is determined that the DU link is in an abnormal status during an operation time of a timer $T_{DU\_link}$ associated with a DU link connection in a central unit;
a power supply control step of controlling power to be supplied to the distributed unit corresponding to the DU link when it is determined that the DU link has returned to a normal status;
a hardware reset execution step of performing a hardware reset of the distributed unit when a CU link is in an abnormal status before a third timer $T_{CU\_link}$ determined by the distributed unit is terminated;
a DU activation determination step of determining whether activation of the distributed unit is completed during an operation time of a second timer $T_{DU\_act}$ associated with the activation of the DU link after the CU link becomes a normal status; and
a software reset execution step of performing a software reset when it is determined that the activation of the distributed unit is not completed.

17. The method of claim 16, wherein the DU activation determination step of determining whether the activation of the distributed unit is completed during an operation time of a second timer $T_{DU\_act}$ associated with the activation of the DU link after the DU link becomes a normal status, and further comprising a DU power cut-off control step of controlling power to be cut off to a distributed unit corresponding to the DU link or transmitting a reset message to the distributed unit when it is determined that the activation of the distributed unit is not completed.

18. The method of claim 16, further comprising:
a report message transmission step of controlling, by the central unit, a report message to be transmitted through the DU link or a DU link of another distributed unit when it is determined that the quality of the CU link is below a threshold value before the third timer $T_{CU\_link}$ is terminated; and
a resource allocation exclusion step of excluding resource allocation for a specific distributed unit and a DU link associated with the specific distributed unit when the report message is received from the specific distributed unit.

* * * * *